United States Patent
Sano et al.

(10) Patent No.: US 6,348,940 B1
(45) Date of Patent: Feb. 19, 2002

(54) IMAGE FORMING APPARATUS AND SYSTEM AND A RECORDING MEDIUM

(75) Inventors: Homare Sano, Mountain View, CA (US); Junichi Yamamoto, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/959,123

(22) Filed: Oct. 28, 1997

(30) Foreign Application Priority Data

Oct. 31, 1996 (JP) .............................................. 8-290848
Aug. 8, 1997 (JP) .............................................. 9-215328

(51) Int. Cl.[7] .............................. B41J 2/435; H04N 1/23
(52) U.S. Cl. ........................................ 347/247; 358/302
(58) Field of Search .................................. 347/237, 247; 355/50; 53/550; 358/448, 450, 487, 296, 302, 304, 305; 400/621, 231; 346/24, 136; 83/874

(56) References Cited

U.S. PATENT DOCUMENTS

| 4,604,632 A | * | 8/1986 | Matsumoto | 346/24 |
| 5,522,657 A | * | 6/1996 | Jamzadeh et al. | 358/302 |
| 5,576,836 A | * | 11/1996 | Sano et al. | 358/302 |
| 5,608,542 A | * | 3/1997 | Krahe et al. | 358/449 |
| 6,019,529 A | * | 2/2000 | Yamamoto et al. | 400/231 |

FOREIGN PATENT DOCUMENTS

| JP | 6-274580 | 9/1994 |
| JP | 08110578 | 4/1995 |
| JP | 07146518 | 6/1995 |
| JP | 07234454 | 9/1995 |
| JP | 7-333736 | 12/1995 |
| JP | 8-029883 | 2/1996 |
| JP | 9-116857 | 5/1997 |
| JP | 9-190546 | 7/1997 |

* cited by examiner

Primary Examiner—Hai C. Pham
(74) Attorney, Agent, or Firm—McDermott, Will & Emery

(57) ABSTRACT

An image forming system is provided with an image memory for storing a number of frame images, a composite image generator for generating a composite image bearing frame images, and a composite image recorder for recording generated composite image on a recording medium having a base layer, an adhesive layer, and a recording layer. The system is further provided with a separation former for forming a perforation line on the recording medium for dividing a specified frame image from the other frame image.

26 Claims, 32 Drawing Sheets

FIG. 24A
FIG. 24B
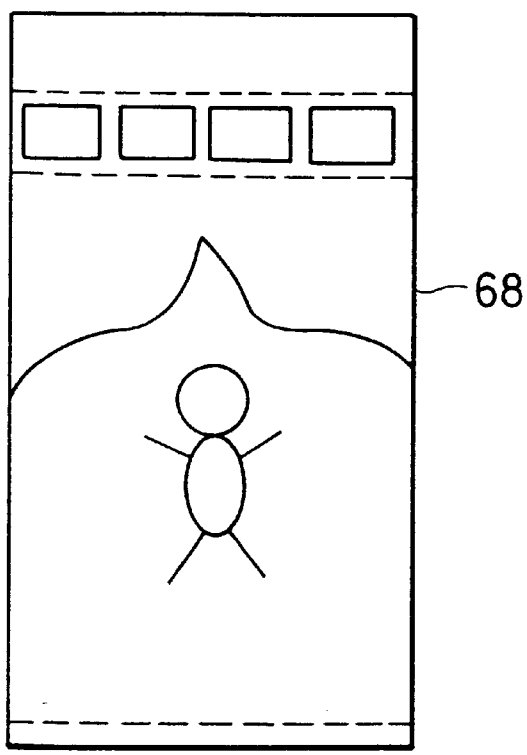
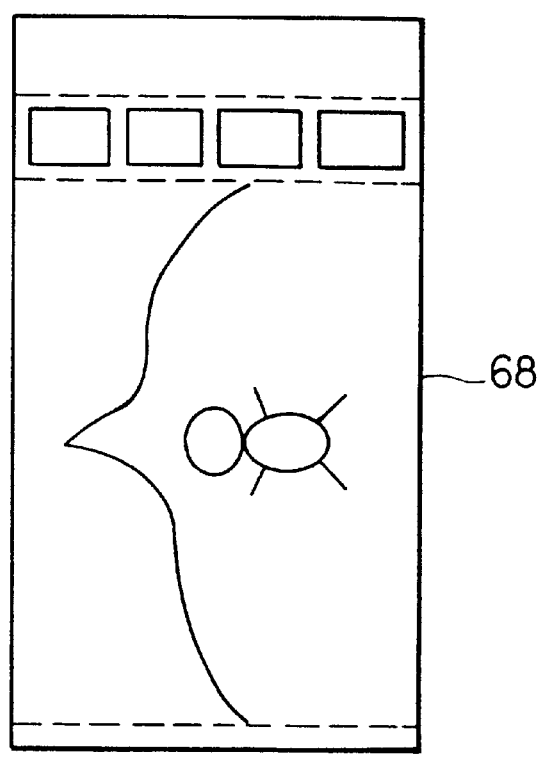

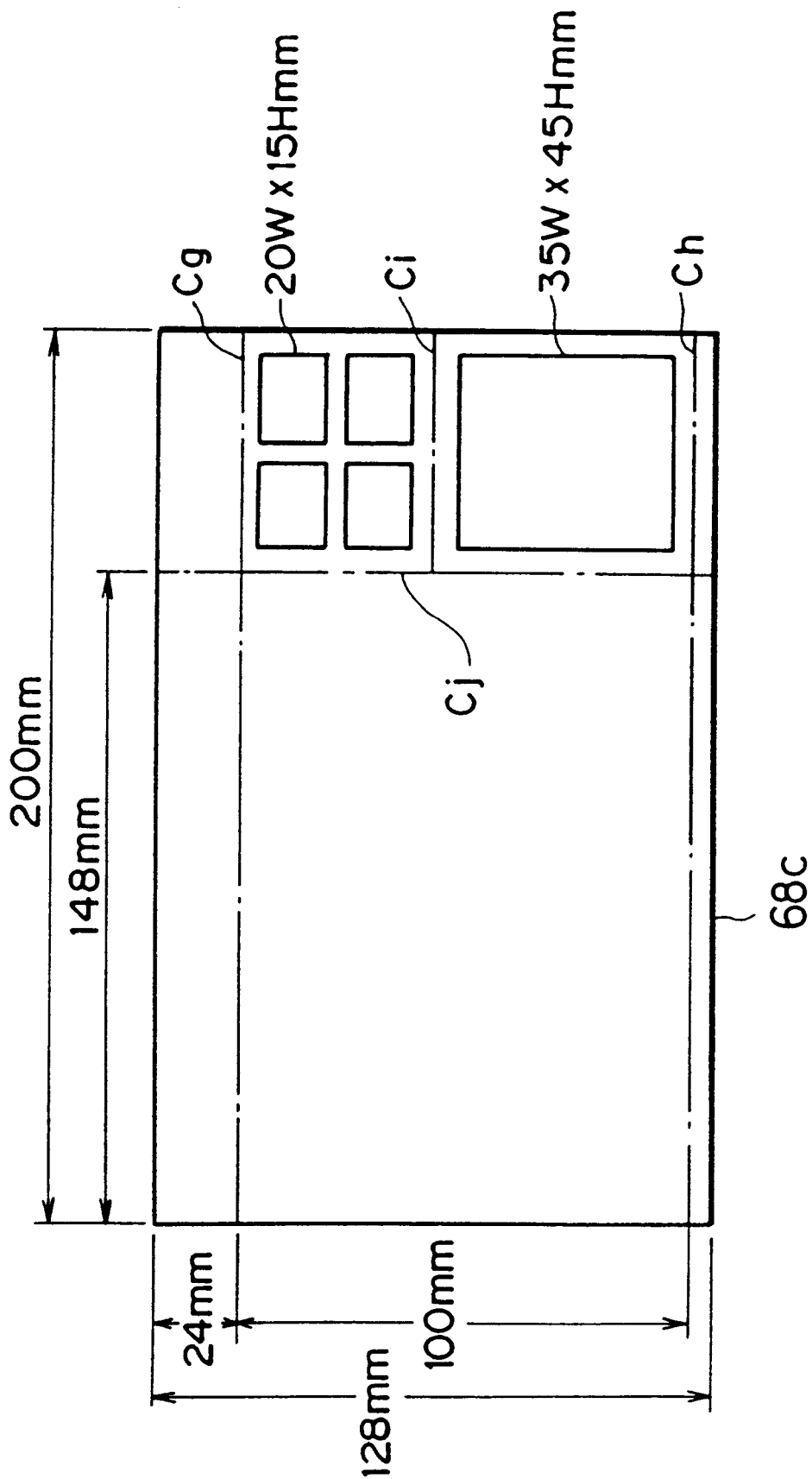

IMAGE FORMING APPARATUS AND SYSTEM AND A RECORDING MEDIUM

BACKGROUND OF THE INVENTION

1. Field of the Invention

This invention relates to an image forming apparatus and system which are capable of visualizing a plurality of images on a recording medium. The present invention also relates to a recording medium on which images are formed by an image forming apparatus or system.

2. Description of the Related Art

Processing laboratories have been offering a so-called index print service of printing reduced images of all the frames in a matrix array on a single printing sheet so that the contents of the images recorded on a roll film and a disk film can be known.

Japanese Unexamined Patent Publications Nos. 7-146518 and 7-234454 disclose index image generating apparatuses for printing all the frames of images recorded in one film on a single printing sheet. These index image generating apparatuses generate an index image as follows. Images in the respective frames are picked up from a negative film and a magnetic information on the number of exposures is read from the negative film. Based on the number of exposures, a predetermined specific index format (a format including an array pattern and the size of the images of the respective frames) is set. The index image is generated by arranging the images of the respective frames in a matrix manner in accordance with the index format.

Further, the former application No. 7-146518 discloses that the size of the images of the respective frames is changed according to the number of exposures in order to arrange a plurality of images on a single printing sheet in a well-balanced manner. Specifically, the smaller the number of exposures, the larger the images of the respective frames in the index image.

Further, Japanese Unexamined Patent Publication No. 8-110578 discloses an image reproducing apparatus for generating an index image from all the frames of images recorded in the film and reproducing this index image on a cathode ray tube. This publication discloses that the displayed image can be zoomed up or down for each frame in a display screen for the index image.

The index images generated by the apparatuses being in practical use or the apparatuses of the above publications are convenient in confirming all the frames of images recorded in one film at once. However, since the reduced images of the respective images (whole image) are arranged in a matrix manner on the single printing sheet, it is difficult to see the images of the respective frames and to distinguish the contents thereof.

Particularly, the larger the number of exposures, the more the images of the respective frames are reduced. Accordingly, it becomes difficult to distinguish the contents of the images recorded in the film based on the contents of the images of the respective frames of the index image. This leads to a reduction in index effects including the grasp of the contents of the index image and the search of the frames.

Apart from the above index printing apparatuses, an apparatus for combining a self-portrait image and a background image and printing this combined image on a seal print sheet has become popular in recent years. In this apparatus, 16 of the same combined images are printed on the seal print sheet while being arranged in a matrix manner. The seal print sheet has halfcuts which are so formed as to conform to the contour of the respective frames, so that the frames of the combined images can be individually peeled from a pasteboard. A user peels the combined image for each frame and uses as a seal (hereinafter, "frame seal").

The application of this frame seal is being devised. For example, taking advantage of its small size, the frame seal is applied to a name card. This use is very effective because a person who receives a name card can recognize a name in relation to a face. However, since the frame seal has a small size, an amount of information which can be printed in the frame image is limited. Thus, the frame seal is not suited to the use of being applied to a post card or a letter.

On the other hand, it is difficult to keep the seal print sheet having several frame seals peeled therefrom because the unnecessary pasteboard remains.

SUMMARY OF THE INVENTION

It is an object of the present invention to provide an image forming apparatus and system which have overcome the problems residing in the prior art.

It is another object of the present invention to provide an image forming apparatus and system which are capable of forming a composite image to a recording medium in a variety of patterns.

It is still another object of the present invention to provide an easily usable recording medium.

According to an aspect of the present invention, an image forming system comprises: an image memory which stores a plurality of frame images; a format memory which stores a format defining an arrangement of frame images for a composite image, at least one frame image of the arrangement having a size larger than that of the other frame images; arranging means for arranging frame images in accordance with the format; image forming means for forming a composite image on a recording medium; and controlling means for controlling the image forming means to form a composite image of frame images in accordance with an arrangement made by the arranging means.

According to another aspect of the present invention, an image forming apparatus comprises: a holder which holds recording mediums one over another; a transporter which transports a recording medium along a specified direction; an image former which forms an image on the recording medium transported by the transporter; and a separation former which forms a separation on the recording medium transported by the transporter for dividing a specified region of the recording medium from the other region.

According to still another aspect of the present invention, a recording medium for use in an image forming apparatus, the recording medium comprises: a base layer; an adhesive layer separably attached on the base layer; a recording layer attached on the adhesive layer; and a separation for defining a plurality of divisions in the recording layer, each division operable to bear an image.

These and other objects, features and advantages of the present invention will become more apparent upon a reading of the following detailed description and accompanying drawings.

BRIEF DESCRIPTION OF THE DRAWINGS

FIG. 24A is a diagram showing an example of an image to be printed while being vertically framed;

FIG. 24B is a diagram showing an example of an image to be printed while being horizontally framed;

FIG. 36 is a diagram showing still another array pattern when the seal printing sheet is horizontally set.

DETAILED DESCRIPTION OF THE PREFERRED EMBODIMENTS OF THE INVENTION

Figure 1:
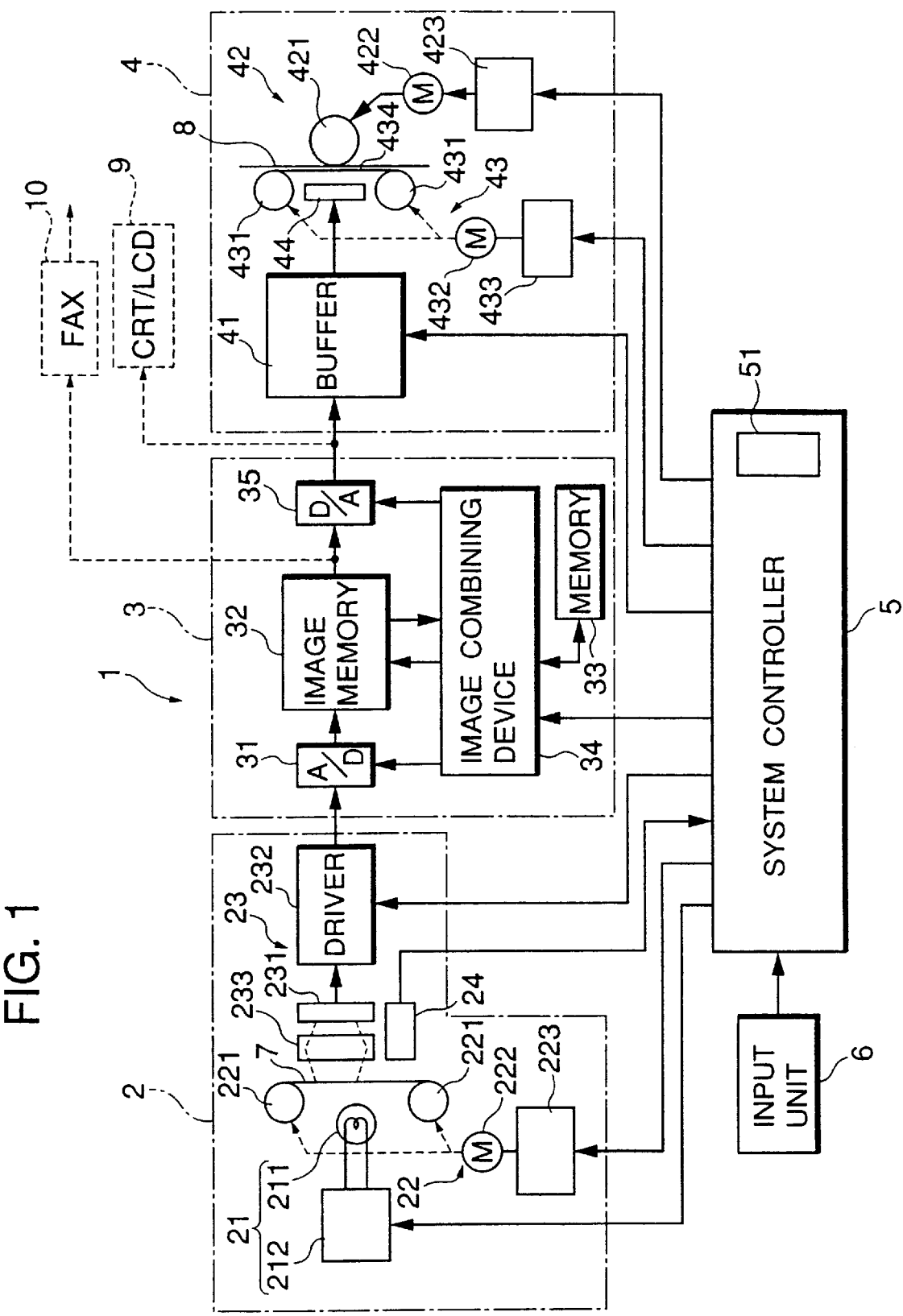
FIG. 1 is a schematic diagram showing a construction of a first image forming system embodying the invention.

Referring to FIG. 1 showing a construction of a first image forming system embodying the invention, this image forming system reads images recorded in respective frames of an exposed film (hereinafter, "frame images"), combining read frame images into an index image or composite image in which the frame images are arrayed in a specified pattern, and prints the index image on, for example, a recording sheet.

In this image forming system, a normal mode and an enlargement mode can be selectively set. An index image in which all the frames of images are arrayed is generated in the normal mode, whereas an image in a specified center area of each frame is extracted and an index image in which the enlarged images of the extracted images are arrayed is generated in the enlargement mode.

In place of or separately from a printer unit 4, a display device 9 such as a CRT or LCD and/or a facsimile 10 may be connected with the image forming system, so that an index image can be reproduced and displayed on the display device or transmitted to an unillustrated other communication equipment and reproduced and displayed on a display device in a remote place via this communication equipment. For example, if the display device 9 is provided separately from the printer unit 4, images outputted from the printer unit 4 can be confirmed via the display device 9 in advance. If the image is outputted by the printer unit 4 by designating or canceling an image outputted by a key input after the confirmation via the display device 9, unnecessary printing can be prevented. The following description will be made taking a system for printing the index image on a recording sheet as an example.

In FIG. 1, the image forming system 1 includes a film scanner unit 2, an image processor unit 3, the printer unit 4, a system controller 5, and an input unit 6. The film scanner unit 2 automatically reads the respective frame images of a film 7. The image processor unit 3 stores the frame images read by the film scanner unit 2 in an image memory 32 after applying a specified image processing thereto, and generates an image data to be outputted from the image data stored in the image memory 32. The printer unit 4 prints the image data generated by the image processor unit 3 on a recording sheet 8. The system controller 5 centrally controls the drive of the image processor unit 3 and the printer unit 4. The input unit 6 inputs a variety of pieces of information including the size of the recording sheet 8, a recording direction, the number of images to be stored and the type of the film 7 and a variety of commands including mode setting of the normal/enlargement modes and a printing start.

The film scanner unit 2 includes a light source 21, a film feeder 22, an image reader 23 and a frame number detector 24. The light source 21 illuminates the film 7 which is a roll film or a strip film obtained by dividing the roll film in order to project the respective frame images of the film 7 to a sensing surface of the image reader 23. The film feeder 22 automatically feeds the respective frame images of the film 7. The frame number detector 24 detects the number of frames which are actually exposed to the film 7.

The light source 21 includes a lamp 211 and an emission control circuit 212 for controlling the amount of light emitted from the lamp 211, and illuminates the film 7 with a specified light amount in accordance with a control signal from the system controller 5. The film feeder 22 includes a feed roller 221, a drive motor 222 for driving the feed roller 221 and a control circuit 223 for the drive motor 222, and feeds the frame images to a reading position one by one in accordance with a control signal from the system controller 5 when the frame image is to be read.

The image reader 23 includes a solid-state image pickup device 231 including, e.g. a CCD (Charge Coupled Device) for reading the frame image set in the reading position, a CCD driver 232 for controlling the drive of the CCD 231 and an optical system 233 for projecting the frame image on the sensing surface of the CCD 231. The image reader 23 reads the respective frame images by photoelectrically converting them into electrical signals and outputs the read image signals to the image processor 3.

The CCD 231 may be constructed by a monochromatic image pickup device, but preferably by a color image pickup device provided with color filters of red (R), green (G) and blue (B). Alternatively, an optical filter of R, G and B and a filter drive circuit for driving this optical filter may be provided between the monochromatic CCD and the film to pick up the frame image by splitting it into color images of R, G and B. The CCD driver 232 and the optical system 233 are controllably driven by the system controller 5.

The frame number detector 24 includes a code reader for reading a code optically recorded in a non-recording area where the perforation of the film 7 is provided in correspondence with each frame, and a density sensor for reading the density of a recording area of each frame. The frame number detector 24 detects the number of frames based on the read code and the density information of each frame. The frame number detector 24 also detects an unexposed frame by discriminating, based on the density information of each frame, whether an image is recorded in the frame, and detects the number of actually exposed frames by subtracting the number of unexposed frames from the total number of frames detected from the code. The total number of frames and the frame numbers of the unexposed frames are sent to the system controller 5.

In a film adopted for an advanced photosystem, a code plate DK on which pieces of information are recorded in the form of a bar code is provided at one end of a cylindrical film cartridge KT, and a total number of frames is recorded on this code plate DK. In the case that such a film is used, a bar code reader including an optical sensor and a driver for this optical sensor may be provided to read the bar code on the code plate DK in place of or separately from the frame number detector 24, and the total number of frames can be detected based on the code information read by this bar code reader.

Figure 2:
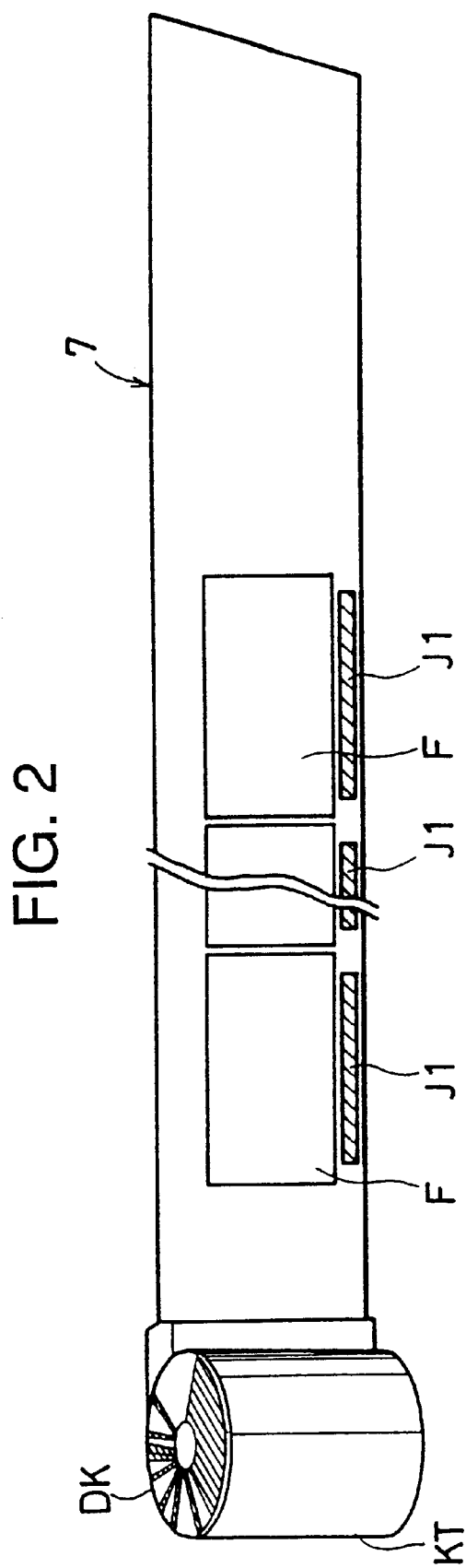
FIG. 2 is a perspective view of an exemplary film provided with magnetic recording portions.
Figure 3:
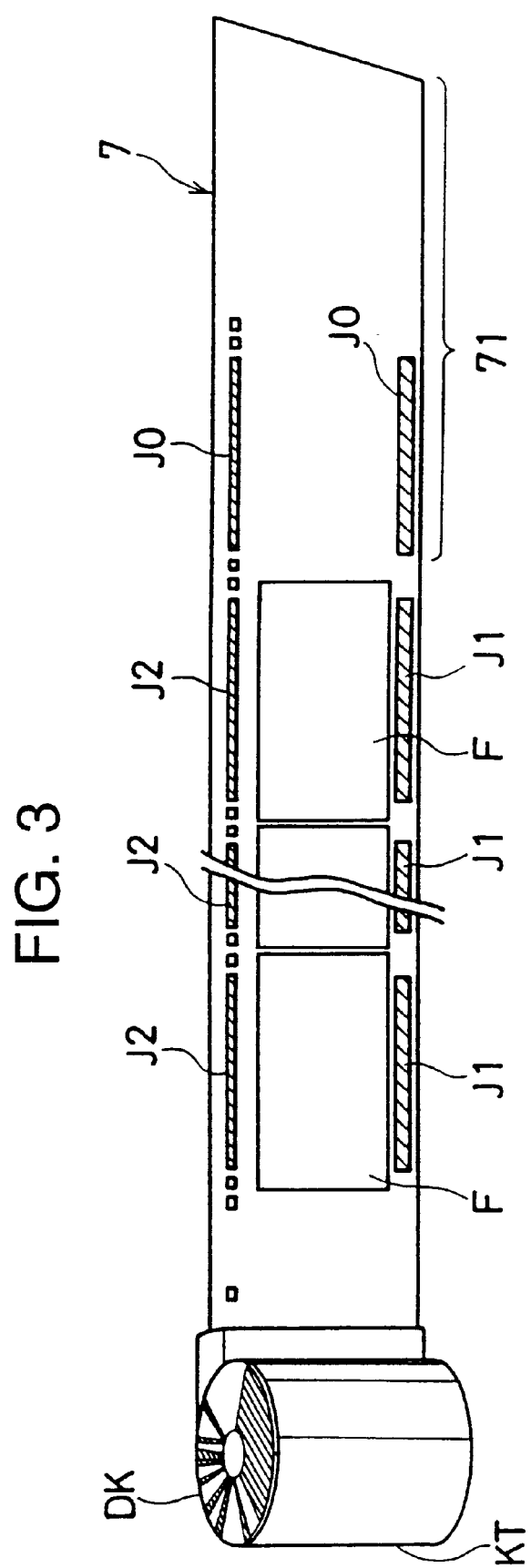
FIG. 3 is a perspective view of another exemplary film provided with magnetic recording portions.

In the film adopted for the advanced photosystem, magnetic recording portions J1 are so provided as to correspond to the respective frames F at one side of the film 7 as shown in FIG. 2. Pieces of information peculiar to each frame F including a date of photographing and photographing conditions (exposure, magnification etc.) can be magnetically recorded in the magnetic recording portion J1. Alternatively, as shown in FIG. 3, magnetic recording portions J0, J1, J2 are so provided as to correspond to a leader portion 71 and the respective frames F at the opposite sides of the film 7. Pieces of information concerning the film 7 including a total number of frames of the film 7, the number of frames actually exposed, a title, and places where photographing was conducted are magnetically recorded in the magnetic recording portion J0 provided in the leader portion 71, whereas pieces of information peculiar to the respective frames F are magnetically recorded in the magnetic recording portions J1, J2 provided in correspondence with the respective frames F.

In the case of using the film 7 in which the total number of frames, the number of frames actually exposed and information as to whether or not a photographed image is recorded in each frame F are recorded in the magnetic recording portions J0, J1, J2, the number of frames actually exposed and the information as to whether or not the photographed image is recorded in each frame can be known based on the information recorded in the magnetic recording portion J0 to J2. Accordingly, by providing a magnetic information reader including a magnetic head and a magnetic head driver in place of or separately from the frame number detector 24, the total number of frames, the number of frames actually exposed and the information as to whether or not a photographed image is recorded in each frame F may be detected based on the magnetic information read by this magnetic information reader.

The image processor unit 3 includes an analog-to-digital (A/D) converter 31, an image memory 32, a memory 33, an image combining device 34, and a digital-to-analog (D/A) converter 35. The AID converter 31 converts an analog image signal inputted from the film scanner unit 2 into a digital image signal. The image memory 32 includes a RAM (random access memory) for storing a data of the frame image converted into the digital signal by the A/D converter 31 (hereinafter, "image data") and a data to be printed. The memory 33 includes a ROM (Read Only Memory) for storing a character data in advance. The image combining device 34 converts a character information such as a title inputted from the input unit 6 into a character data and generates an index image data from the character data and a plurality of image data stored in the image memory 32 in accordance with a specified index format. The D/A converter 35 D/A-converts the index image data generated by the image combining device 34 and outputs it to the printer unit 4.

The image memory 32 includes a first storage section for storing an image data read by the film scanner unit 2 and a second storage section for storing the generated data to be printed. The image combining device 34 has a memory used for combining the images.

The image combining device 34 converts the character information such as a title inputted from the system controller 5 into a character data in accordance with a control signal from the system controller 5.

The image combining device 34 converts a character information such as a title inputted from the system controller 5 in accordance with the control signal from the system controller 5 into a character data, and stores this character data in a specified area of the second storage section of the image memory 32. The image combining device 34 also generates an index image data in which the respective frame images are arrayed by successively reading the respective image data from the first storage section of the image memory 32, enlarging or reducing these data in accordance with a specified index format and successively storing them in a specified area of the second storage section of the image memory 32.

The index format and the generation of the index image data are described in detail later.

The printer unit 4 includes a buffer 41 for temporarily storing the data outputted from the image processor unit 3, a recording sheet feeder 42 for feeding a recording sheet 8, an ink ribbon feeder 43 for feeding an ink ribbon and a thermal transfer printer head 44. The printer unit 4 forms an image on the recording sheet 8 made of a normal paper sheet or OHP sheet based on the data outputted from the image processor unit 3 in accordance with the control signal from the system controller 5.

The printer head 44 has a dot printing portion of, e.g. one to several lines, and forms an image on the recording sheet 8 in unit of one to several lines. The recording sheet feeder 42 includes a feed drum 421 for feeding the recording sheet 8, a drum motor 422 for drivingly rotating the feed drum 421 and a motor control circuit 423 for controlling the drive of the drum motor 422.

The data generated by the image processor unit 3 is outputted to the printer unit 4 in unit of one to several lines, and is temporarily stored in the buffer 41. The printer unit 4 reads the data from the buffer 41; feeds the recording sheet 8 in the form of a roll sheet or a cut sheet loaded on the feed drum 421 and the ink ribbon 434 in synchronism with the reading of the data; and causes the printer head 44 to press the ink ribbon 434 against the recording sheet 8 to form an image constructed by the above image by thermal transfer. The entire data is printed on the single recording sheet 8 by alternately repeating the image formation by the line(s) and the feeding of the recording sheet 8.

The system controller 5 has a memory 51 including a ROM or the like for storing a program for a routine of generating the index image data corresponding to each index format.

Next, the image processing of the image forming system is described with reference to a flowchart of FIGS. 4 to 8.

Figure 4:
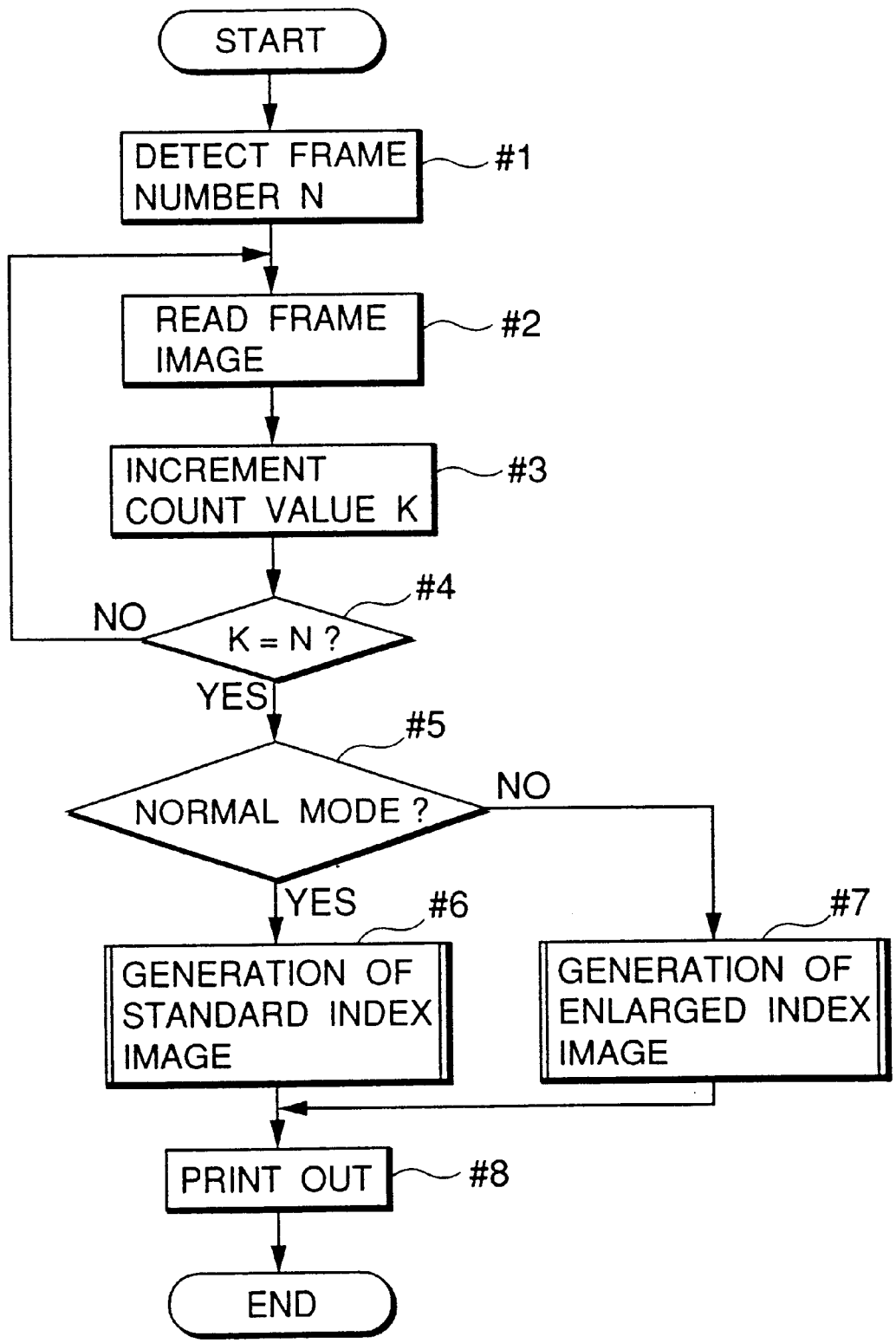
FIG. 4 is a flowchart showing an image processing of the image forming system using an index image generating apparatus according to the invention.

FIG. 4 is a flowchart showing an image processing control executed when all the frame images of a roll film are read, an index image data is generated in accordance with a specified index format corresponding to a total number of frames, and the generated index image data is printed on the recording sheet.

It should be noted that, when printing the frame images, the character information including the titles and comments thereof are inputted via the input unit 6.

When the roll film 7 is loaded in the film feeder 22 and a print start signal is inputted via the input unit 6, a total number of frames N of the roll film 7 are detected by the frame number detector 24 (Step #1). Subsequently, the frame images recorded in the respective frames are successively read (Steps #2 to #4). Specifically, the system controller 5 increments a count value of a frame number counter K by one each time the frame image data is read from the image reader 23 (Step #3). The frame images of the roll film 7 are read until the count value K reaches the total number of frames N.

The total number of frames N may be initially set in the frame number counter K when it is read, and the count value of the frame number counter K may be decremented by one each time the frame image data is read until the count value K becomes equal to 0.

Upon the completion of the reading of all the frame images recorded in the roll film 7 (YES in Step #4), the image processing mode is discriminated (Step #5). If the normal mode is set (YES in Step #5), an index image in which all the frame images are arrayed in accordance with the index format corresponding to the total number of frames N (hereinafter, "standard index image") is generated (Step #6). This index format is an array format in which N frame images are arrayed as an index information in a well-balanced manner on the single recording sheet 8. The index formats corresponding to the total numbers of exposures N are stored in the memory 51.

Figure 5:
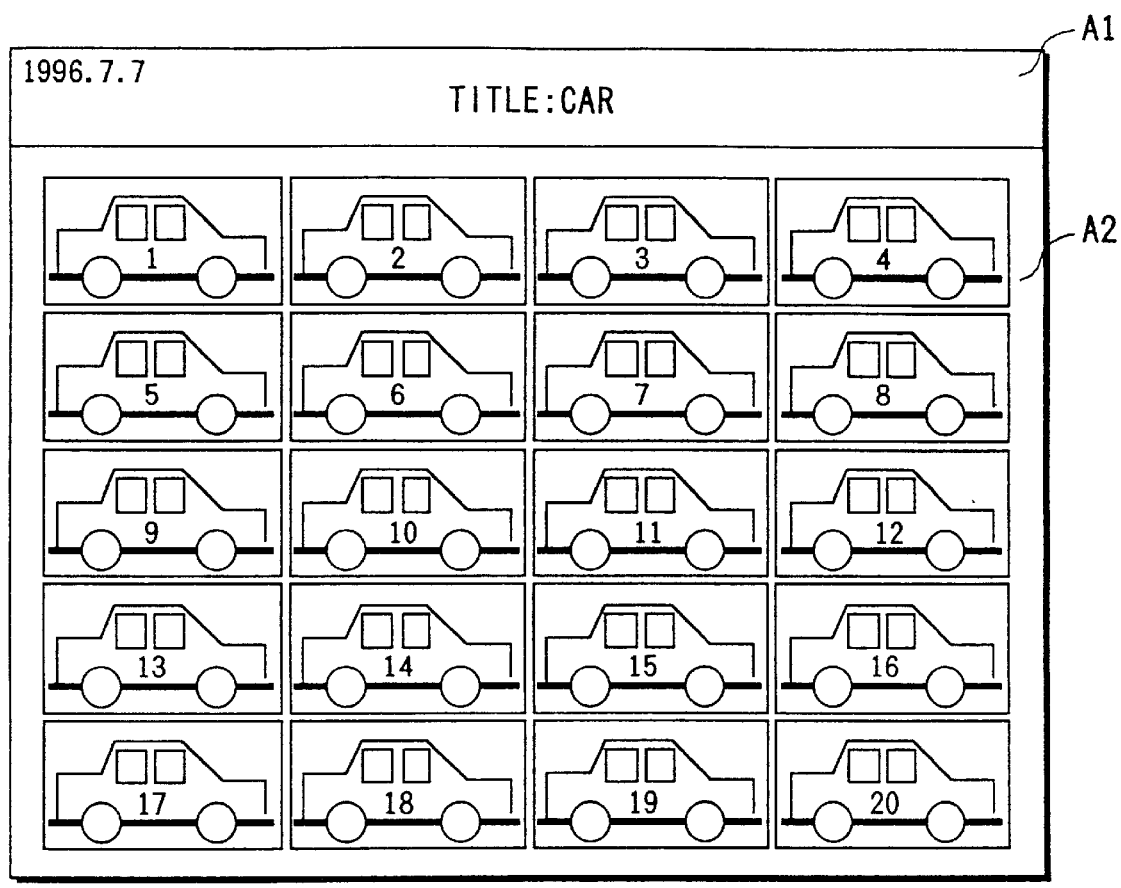
FIG. 5 is a diagram showing an example of a standard index image.

FIG. 5 is a diagram showing an example of the standard index image.

This FIGURE shows a standard index image in which twenty frame images are arrayed in a 4×5 matrix and which is generated so as to be printed on a laterally long recording sheet 8. A memo area A1 is provided at an upper part of the recording sheet 8, and an image area A2 is provided at a lower part thereof. The character information such as titles and comments is recorded in the memo area A1, whereas twenty frame images are recorded in the image area A2. Numbers affixed to the images in the respective display locations are frame numbers.

The display location of each frame image of the image area A2 has the same aspect ratio as each frame of the film F, and an image obtained by reducing or enlarging the entire frame image picked up by the CCD 231 at a specific ratio is displayed in each display location. If a ratio of the frame image picked up by the CCD 231 to an image displayed in the image area A2 is, for example, 1/6, the entire picked frame image is reduced to 1/6 and recorded in a specified location of the image area A2.

In FIG. 5, the contents of the respective frame images are the same (side elevation of an automotive vehicle) in order to simplify the drawing. However, as described above, the images corresponding to the respective frames of the film are printed in the display locations of the recording sheet, and the content of the image actually differs for each frame.

If it is assumed that the frame numbers from the leading end of the film 7 are No. 1, NO. 2, . . . No. 20 and the display location of the frame image in the i-th column and j-th row of the image area A2 is (i, j), the frame images of No. 1, No. 2, . . . No. 19, No. 20 are displayed in the display locations (1, 1), (1, 2), . . . (5, 3), (5, 4).

Figure 6:
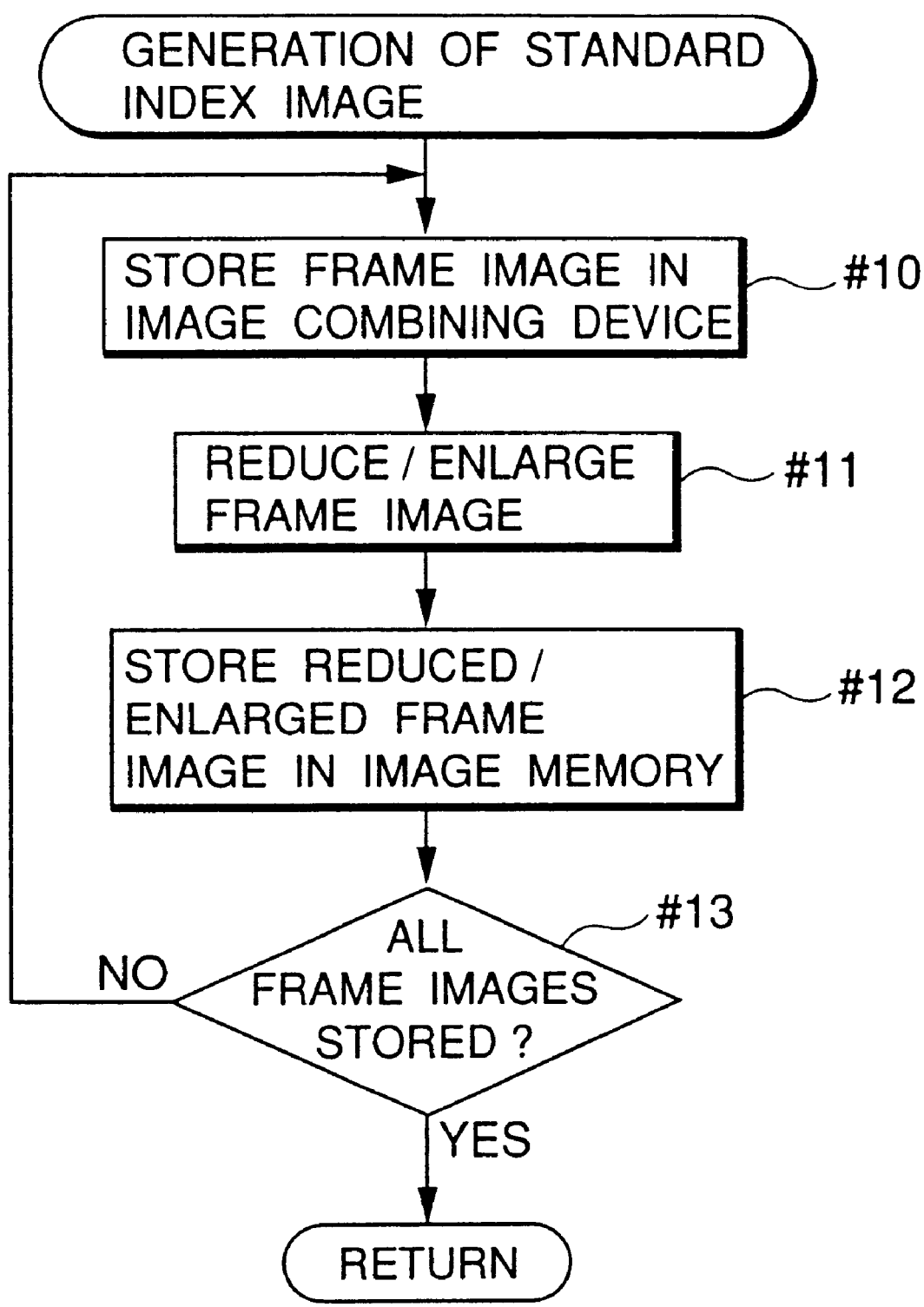
FIG. 6 is a flow chart showing an exemplary image processing for generating the standard index image.

FIG. 6 is a flowchart showing an exemplary image processing for generating the standard index image.

When character data such as a date and titles is recorded in a memory area corresponding to the memo area A1 of the second storage section of the image memory 32, the frame images stored in the first storage section of the image memory 32 are stored in a memory area corresponding to the image area A2 while the standard index image is combined in accordance with the flowchart of FIG. 6.

Specifically, the first one of the frame images recorded in the first storage section of the image memory 32 is stored in the memory of the image combining device 34 used for the image combining purpose (Step #10), and this frame image is reduced or enlarged at a predetermined ratio (Step #11). For example, in the case that the image picked up by the CCD 231 is constructed by 360×240 and the reduction ratio is 1/6, each frame image is converted into a reduced image of 60×40 dots by, for example, regularly thinning out the pixel data along vertical and horizontal directions. This reduced image is stored in a storage area of the second storage section of the image memory 32 corresponding to the display location (1, 1) of the image area A2 (Step #12).

Subsequently, it is discriminated whether all the frame images have been stored after being reduced or enlarged (Step #13). In this case, this routine returns to Step #10 since the recording has not yet been completed, and the reduction/enlargement and the storage are performed for the second frame image (Steps #10 to #12). The above operation is performed for the third and subsequent frame images. When the processing is completed for all the frame images (YES in Step #13), the generation of the standard index image data is completed, and this routine returns.

Referring back to FIG. 4, if the normal mode is not set or the enlargement mode is set in Step #5 (NO in Step #5), an index image in which enlarged images obtained by enlarging the specified central areas of the respective frames are arrayed in accordance with the index format corresponding to the total number of frames N (hereinafter, "enlarged index image") is generated (Step #7).

Figure 7:
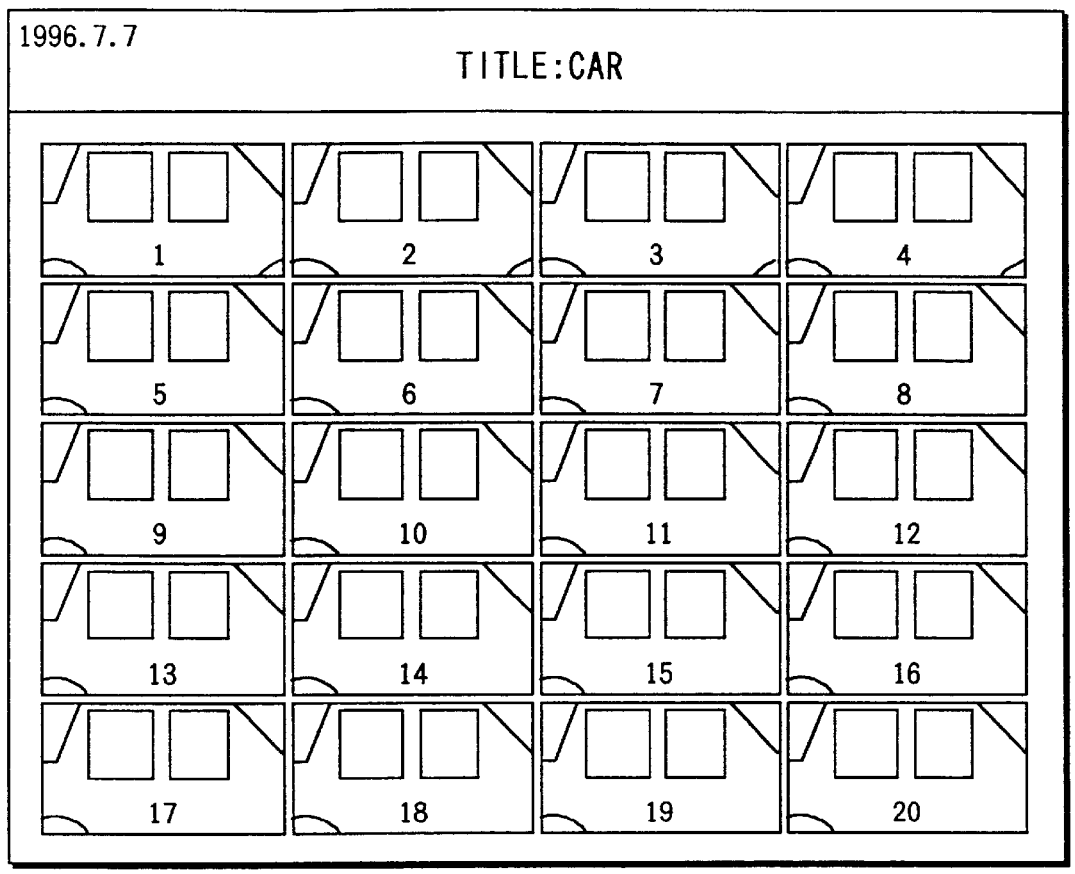
FIG. 7 is a diagram showing an example of an enlarged index image.

FIG. 7 is a diagram of an example of the enlarged index image, in which the central portions of the respective frame images of FIG. 5 are enlargedly displayed.

Figure 8:
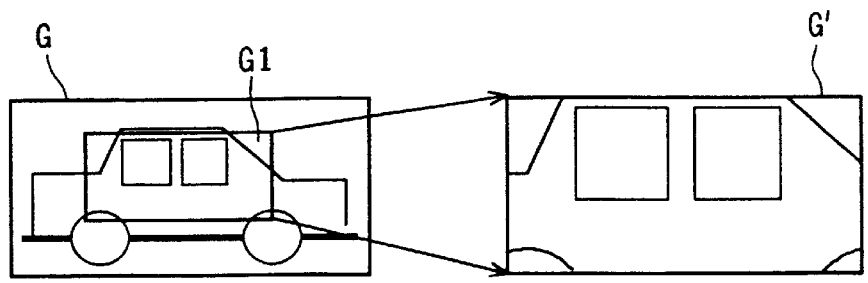
FIG. 8 is a diagram showing an enlarging processing of a frame image.

In FIG. 7, an image G' obtained by enlarging a partial image G1 located within the specified central portion of the frame image G picked up by the CCD 231 as shown in FIG. 8 into an original size is recorded in each display location of the image area A2. Numbers affixed to the images in the respective display locations are frame numbers.

Figure 9:
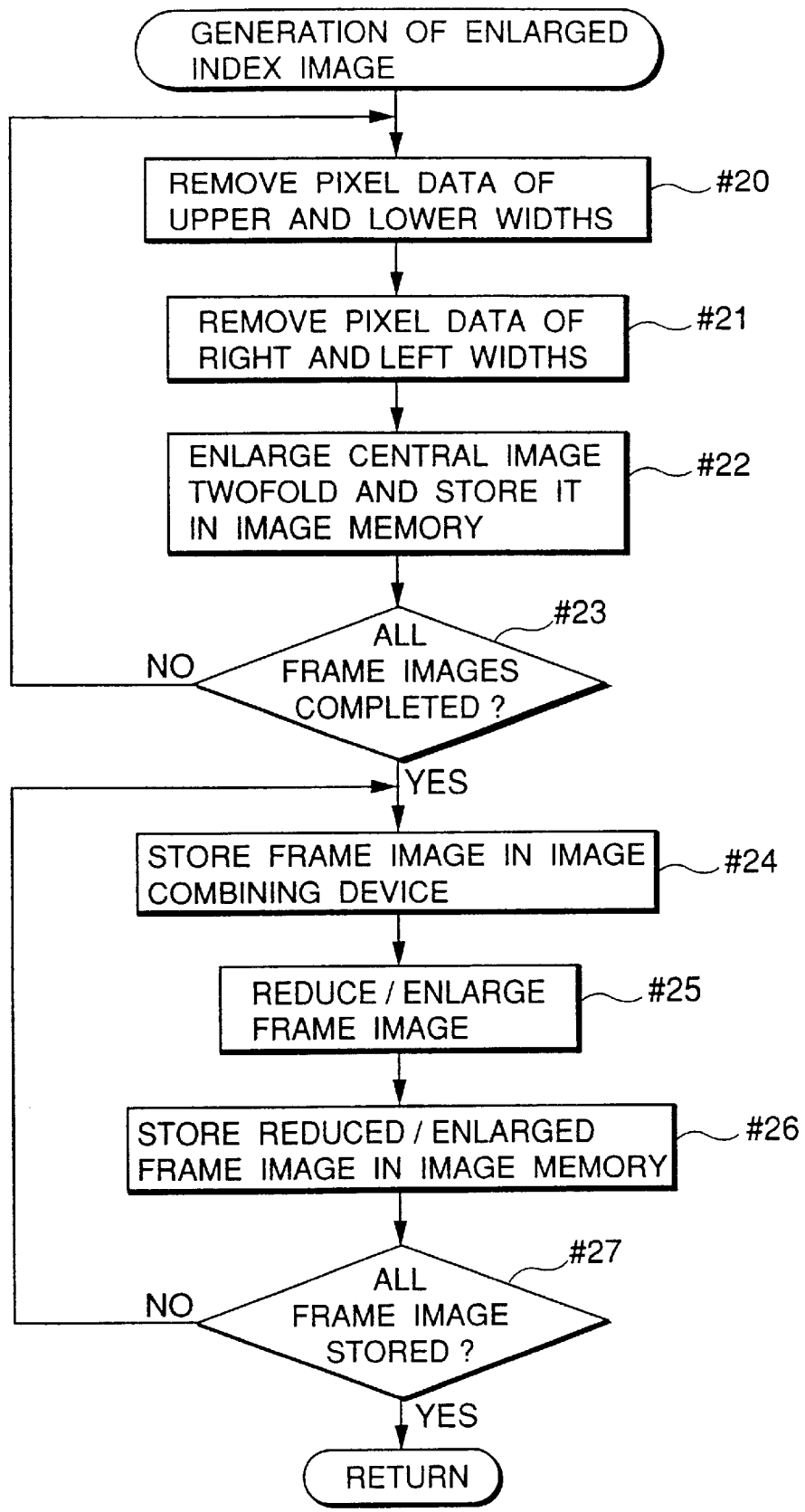
FIG. 9 is a flowchart showing an exemplary image processing for generating an enlarged index image.

FIG. 9 is a flowchart showing an exemplary image processing for generating the enlarged index image. In this flowchart, the partial image G1 located within a central portion (1⁄2 size of the frame image G) of the frame image G is enlarged twofold, and this enlarged image G' is displayed in each display location of the enlarged index image.

Similar to the normal mode, in the enlargement mode, after the character data such as a date and a title is stored in the memory area corresponding to the memory area A1 of the second storage section of the image memory 32, the respective frame images stored in the first storage section of the image memory 32 are stored in the memory area corresponding to the image area A2 while the enlarged index image are combined in accordance with the flowchart of FIG. 9.

Specifically, if the image picked up by the CCD 231 includes 360×240 dots, a central partial image of the first frame image stored in the first storage section of the image memory 32 is enlarged twofold. This twofold enlargement is performed by transferring the pixel data of the central portion obtained by removing the pixel data of a peripheral area (upper and lower widths of 60 dots and right and left widths of 90 dots) from the first frame image to the memory used for the combining processing (Steps #20, #21) and by storing this central image in the first storage section of the image memory 32 while enlarging it (Step #22). In the case that the pixel data are read from the combining processing memory in, e.g. a raster scanning direction and transferred to the first storage section, the above enlargement is performed by doubling the pixel data along horizontal direction by reading the respective pixel data twice and by doubling the pixel data along vertical direction by transferring the line data along horizontal direction twice in a row.

A desired central portion can be enlarged by changing the number of the pixel data to be removed and the enlargement ratio in Steps #20 to #23. For example, if the central portion is enlarged by 1.5, the pixel data in the central area obtained by deleting the pixel data in a peripheral area (upper and lower width of 40 dots and right and left width of 60 dots) from the frame image may be enlarged by 1.5.

Subsequently, it is discriminated whether the enlargement has been applied to all the frame images (Step #23). In this case, this routine returns to Step #20 because the enlargement has been applied only to the first frame image, and the similar enlargement is applied to the second frame image (Steps #20 to #22). Thereafter, the similar enlargement is applied to the third and subsequent frame images. When the enlargement for all the frame images is completed (YES in Step #23), the enlargement index image is generated from these enlarged images.

The enlarged index image is generated in the same method as the standard index image is generated. Specifically, the enlarged first frame image is transferred from the first storage section of the image memory 32 to the combining processing memory of the image combining device 34 (Step #24), and the enlarged image is reduced or enlarged at a predetermined reduction ratio or enlargement ratio (Step #25). The reduced or enlarged image is stored in a storage area of the second storage section of the image memory 32 corresponding to the display location (1, 1) of the image area A2 (Step #26). Subsequently, it is discriminated whether the reduction/enlargement and the storage of all the frame images has been completed (Step #27). In this case, this routine returns to Step #24 because the reduction/enlargement and the storage of all the frame images has not yet been completed, and the second frame image is reduced/enlarged and then stored (Steps #24 to #26). The same processing is applied to the third and subsequent frame images. Upon the completion of the processing to all the frame images (YES in Step #27), the enlarged index image is generated and this routine returns.

Referring back to FIG. 4, the data of the generated standard or enlarged index image is outputted to the printer unit 4 in unit of one to several lines and printed on the recording sheet 8 (Step #8). The printing operation ends when the printing of the entire index image is completed.

As described above, the index image is generated by enlarging the central portions of the respective frame images in the enlargement mode. Accordingly, the contents of the respective frame images can be relatively easily discriminated (compare with FIGS. 5 and 7) even if the size of the respective frames displayed in the index image is small, improving an index effect. For example, in a souvenir picture during a trip or an event picture, person images and an image of the subject of the event are often photographed in the central portions of the respective frames of the film F. If the index image for such as a film F is generated in the enlargement mode, the object images such as people photographed in the respective frames can be easily discriminated and during which trip or in which event this film F was used can be quickly known based on the discrimination result.

In this embodiment, the size of the respective display locations of the index image is the same and the index effect is improved by displaying the enlarged images of the respective frame images in the respective display locations. However, a part of the display locations may be made larger than the other display locations by differing the size of the display locations, and the index effect may be improved by making it easier to distinguish the content of the frame image displayed in the large display location.

Particularly, in the case that the film F contains a plurality of unexposed frames, there may be provided display location(s) having a larger display size (hereinafter, "enlarged display locations") by reducing the display area of the unexposed frames in the index image. Suitable frame image(s) may be enlargedly displayed in the enlarged display location(s).

Figure 10:
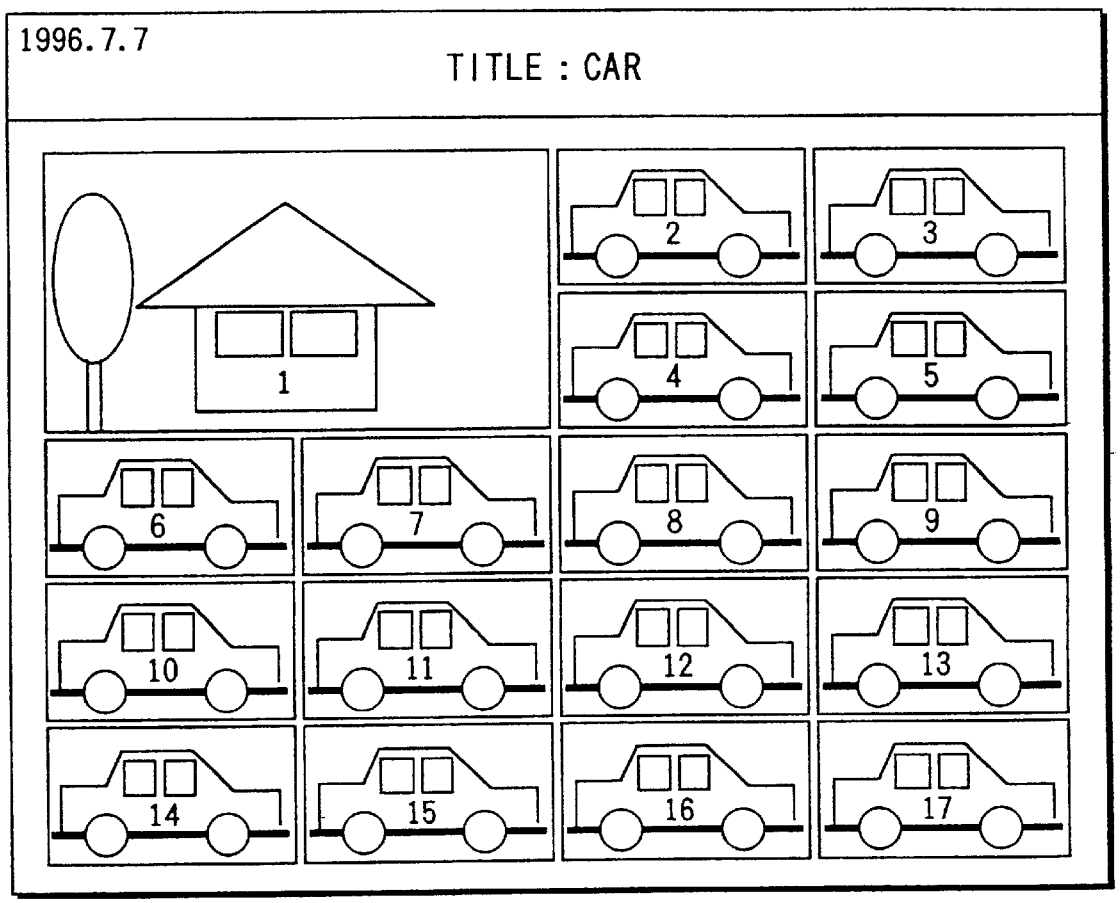
FIG. 10 is a diagram showing a first index image having a display location of an enlarged size.

FIG. 10 shows an example of the index image in which an enlarged display location is provided in the image area A2 and a suitable frame image is enlargedly displayed there.

FIG. 10 shows a case where last three frames (frames No. 18 to No. 20) of twenty frames are unexposed; display areas of the first frame and the last three frames are combined to provide an enlarged display location having four times as large as the other frame images at an upper left corner; and the first frame image is enlargedly displayed in the enlarged display area. It should be noted that numbers affixed to the images in the respective display locations are frame numbers.

The enlarged display location is produced by allotting the display locations (1, 2), (2, 1), (2, 2) neighboring the display location (1, 1) of the first frame image as the display locations of the frames No. 18 to No. 20 in the case of the standard index image and by combining them into one. If this enlarged display location is (1, 1) and the other display locations are (i, j) in the standard index image (accordingly, locations (1, 2), (2, 1), (2, 2) do not exist any longer), the frame image No. 1 is displayed in the enlarged display location; the frame images No. 2 to No. 5 are displayed in the display locations (1, 3), (1, 4), (2, 3), (2, 4); and the frame images No. 6 to No. 17 are displayed in the display locations (3, 1), (3, 2), . . . (5, 4).

Figure 11:
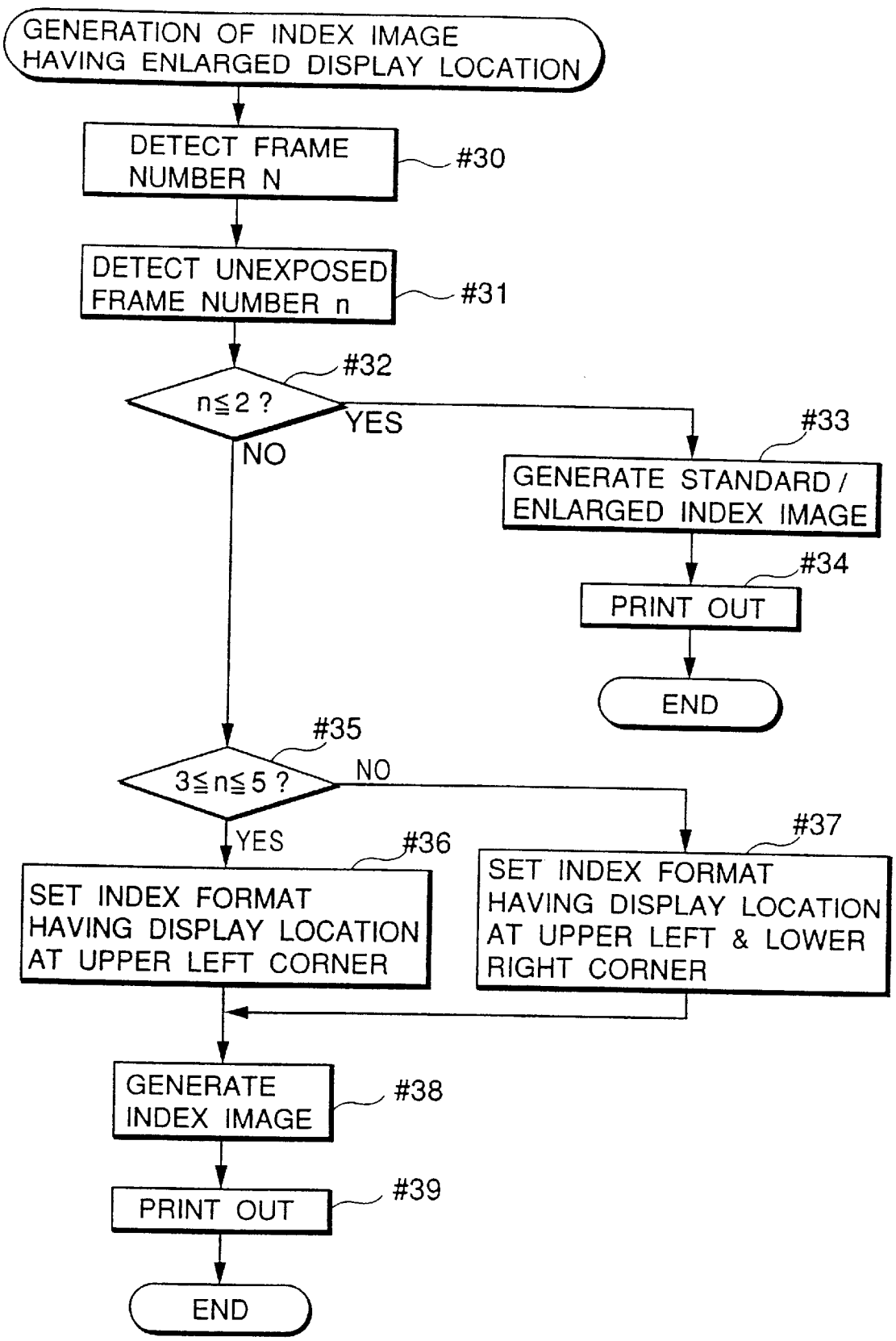
FIG. 11 is a flowchart showing an exemplary processing of generating the first index image.

FIG. 11 is a flowchart showing an exemplary processing for generating the index image having the enlarged display location. This flowchart is used in the case of generating an index image including one or two enlarged display locations having four time as large a display area as the other display locations.

When the roll film 7 is loaded in the film feeder 22 and a print start signal is inputted via the input unit 6, the total number of frames N of the roll film 7 and an unexposed frame number n are detected by the frame number detector 24 (Steps #30, #31). The total number of frames N is detected by reading the code, and the unexposed frame number n is detected by feeding the roll film 7 while reading the density information of the respective frames F and by discriminating based on the read density information whether the respective frames F are exposed.

Subsequently, it is discriminated whether the unexposed frame number n is 2 or smaller (Step #32). If n≦2 (YES in Step #32), the standard or enlarged index image is generated in accordance with the flowchart of FIG. 4 or 9 (Step #33) since the enlarged display location cannot be set, and the index image is printed by the printer unit 4 based on the data of the generated index image (Step #34).

If n>2 (NO in Step #32), it is further discriminated whether the unexposed frame number n is between 3 and 5 (Step #35). If 3≦n≦5 (YES in Step #35), an index format is set in which the enlarged display location having four times as large is provided at an upper left corner (Step #36). If 5<n (NO in Step #35), an index format is set in which two enlarged display locations having four times as large are provided at upper left and lower right corners (Step #37). If the index formats having the enlarged display location(s) are set in advance and a suitable one is selected according to the unexposed frame number n, it is advantageous in speeding up the processing. However, it is also possible to determine the index format by an operational expression using the unexposed frame number n.

Subsequently, the index image is generated in accordance with the set index format (Step #38). The index format set in Step #36 corresponds to the index image shown in FIG. 10. In this case, if the index image is generated by 1/6 reduction, the first (No. 1) one of the frame images stored in the first storage section of the image memory 32 is reduced at a ratio of 1/3 and then stored in the enlarged display location (location corresponding to (1, 1)) of the second storage section of the image memory 32. The frame images No. 2 to No. 5 are reduced by a ratio of 1/6, and stored in the display locations (1, 3), (1, 4), (2, 3), (2, 4) of the second storage section of the image memory 32. The frame images No. 6 to No. 17 are reduced by a ratio of 1/6, and stored in the display locations (3, 1), (3, 2), . . . (5, 4) of the second storage section of the image memory 32.

Figure 12:
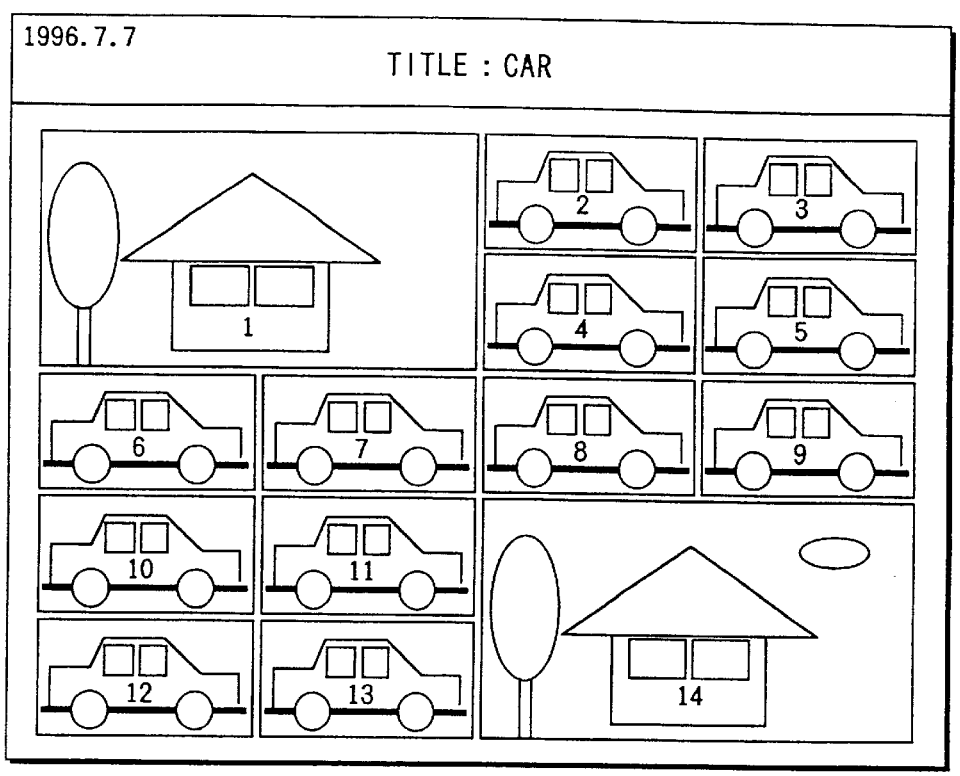
FIG. 12 is a diagram showing a second index image having a display location of an enlarged size.

On the other hand, the index format set in Step #37 corresponds to the index image shown, for example, in FIG. 12. FIG. 12 shows a case where last six frames (No. 15 to No. 20) of twenty frames are unexposed; display areas of the unexposed frames No. 1, No. 15 to No. 17 are combined to provide an enlarged display location having four times as large as the other frame images at the upper left corner; display areas of the unexposed frames No. 14, No. 18 to No. 20 are combined to provide an enlarged display location having four times as large as the other frame images at the lower right corner; and the frame image No. 1 is enlargedly displayed in the enlarged display area at the upper left corner and the frame image No. 14 is enlargedly displayed in the enlarged display area at the lower right corner.

It should be noted that numbers affixed to the images in the respective display locations are frame numbers. By providing the enlarged display locations, the locations (1, 2), (2, 1), (2, 2), (4, 3), (4, 4) and (5, 3) disappear. The frame images No. 2 to No. 5 are displayed in the display locations (1, 3), (1, 4), (2, 3) and (2, 4); the frame images No. 6 to No. 9 in the display locations (3, 1) to (3, 4), and the frame images No. 10 to No. 13 in the display locations (4, 1), (4, 2), (5, 1) and (5, 2).

In this case, the frame images No. 1 and No. 4 stored in the first storage section of the image memory 32 are reduced at a reduction ratio of 1/3 and stored in the enlarged display locations of the second storage section of the image memory 32. The frame images No. 2 to No. 13 are reduced at a reduction ratio of 1/6 and stored in the specified normal size display locations of the second storage section of the image memory 32.

The index image is printed in accordance with the data thereof in the printer unit 4 (Step #39).

In this index image as well, the enlarged images of the respective frame images may be arrayed. The entire image may be displayed in the enlarged display location, and the enlarged images may be displayed in the other display locations.

Although the enlarged display location is provided at the upper left and lower right corners of the image area A2 in the examples of FIGS. 10 and 12, it may be provided in any desired location within the image area A2 provided that the enlarged display makes the content of the index image easily visible. Particularly, in FIG. 12, the enlarged display locations are arranged at the upper left and lower right corners in view of a layout balance of the frame images of the enlarged size and the frame images of the normal size. However, two frame images of the enlarged size may be arranged in the first and second rows and the frame images of the normal size may be arranged in the third to fifth rows.

The image displayed in the enlarged display location (1, 1) is not limited to the first frame image, but any desired frame image may be selected. In this embodiment, the overall photographed contents of the film is made easily distinguishable based on the frame image displayed in the enlarged display location. Accordingly, if the frame image representing the photographed contents of the film is known in advance, it is preferable to improve the index effect by making an input of the frame image to be displayed in the enlarged display location by the input unit 6 possible so that the image of the frame designated by a user can be displayed in the enlarged display location.

Figure 13:
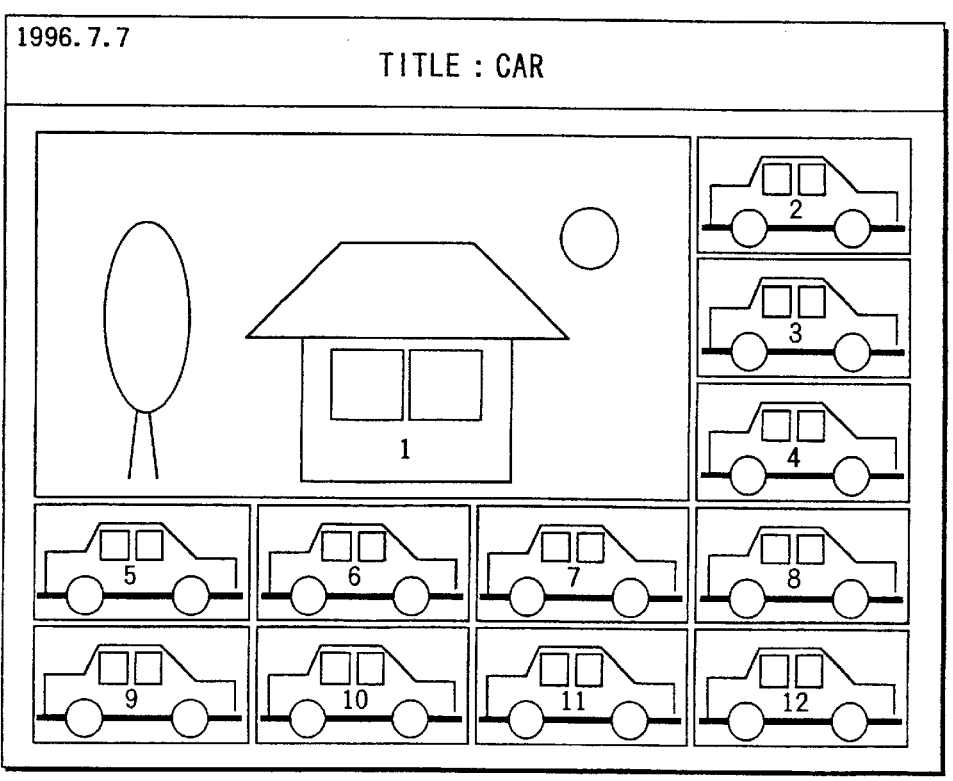
FIG. 13 is a diagram showing a third index image having a display location of an enlarged size.

Further, in the example of FIG. 13, if there are eight or more unexposed frames, the first display location and the display locations of the eighth unexposed frames may be combined to provide an enlarged display location having nine times as large as the other frame images at an upper left corner. Specifically, a display location having a maximum size in relation to the number of the unexposed frames is provided, and a desired exposed frame image is enlargedly displayed in this enlarged display location. With this arrangement, even when there are many unexposed frames, the image area A2 of the index image can be effectively utilized and the respective frame images can be displayed in a well-balanced manner and in such a manner that the photographed contents of the film can be easily recognized.

Figure 14:
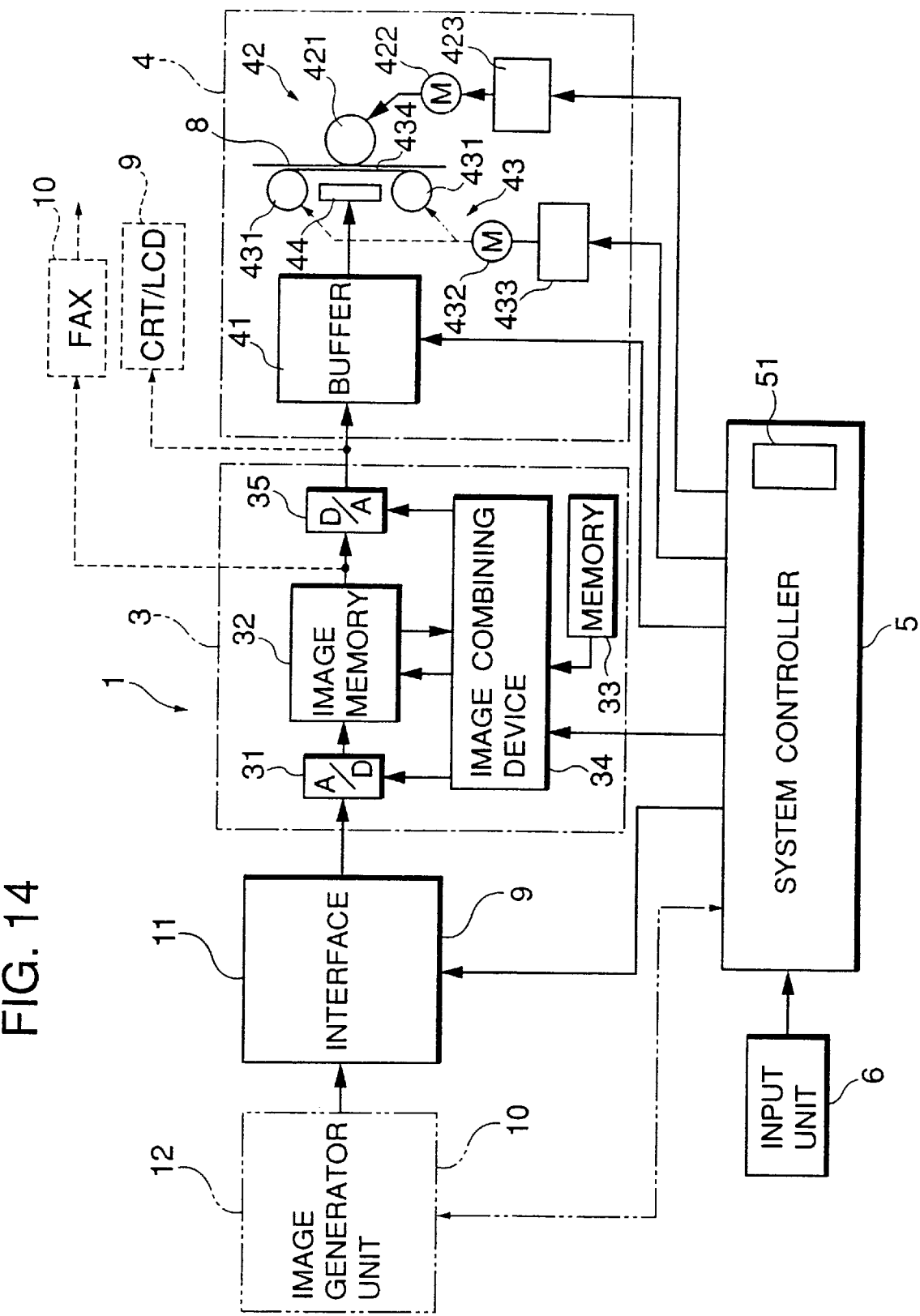
FIG. 14 is a schematic diagram showing a construction of a second image forming system embodying the invention.

FIG. 14 is a schematic diagram showing a construction of a second image forming system embodying the invention.

In the second image forming system, instead of the film scanner unit 2 of FIG. 1, an image generator unit 12 is connected with the image processor unit 3 via an interface 11. The image generator unit 12 includes an image generator such as a computer, an image reader such as an image scanner, a still image photographing device such as a still video camera, and a recording medium driver (information reader) for reading image data from a magnetic disk, an optical disk, a photomagnetic disk or like recording medium in which the image data are stored.

In the second embodiment, images such as graphs and graphics generated by the image generator unit 12, a plurality of images read by the image scanner or a plurality of still images photographed by the still video camera are combined into an index image in which these images are arrayed in a specified pattern, and this index image is made visible on a recording sheet or on a display device such as a CRT.

In the second embodiment, since a plurality of image data collected from a variety of sources can be edited into a single image data, the visualized image can be used not only as an index information but also as a reference material or filing material for, e.g. a presentation.

Figure 15:
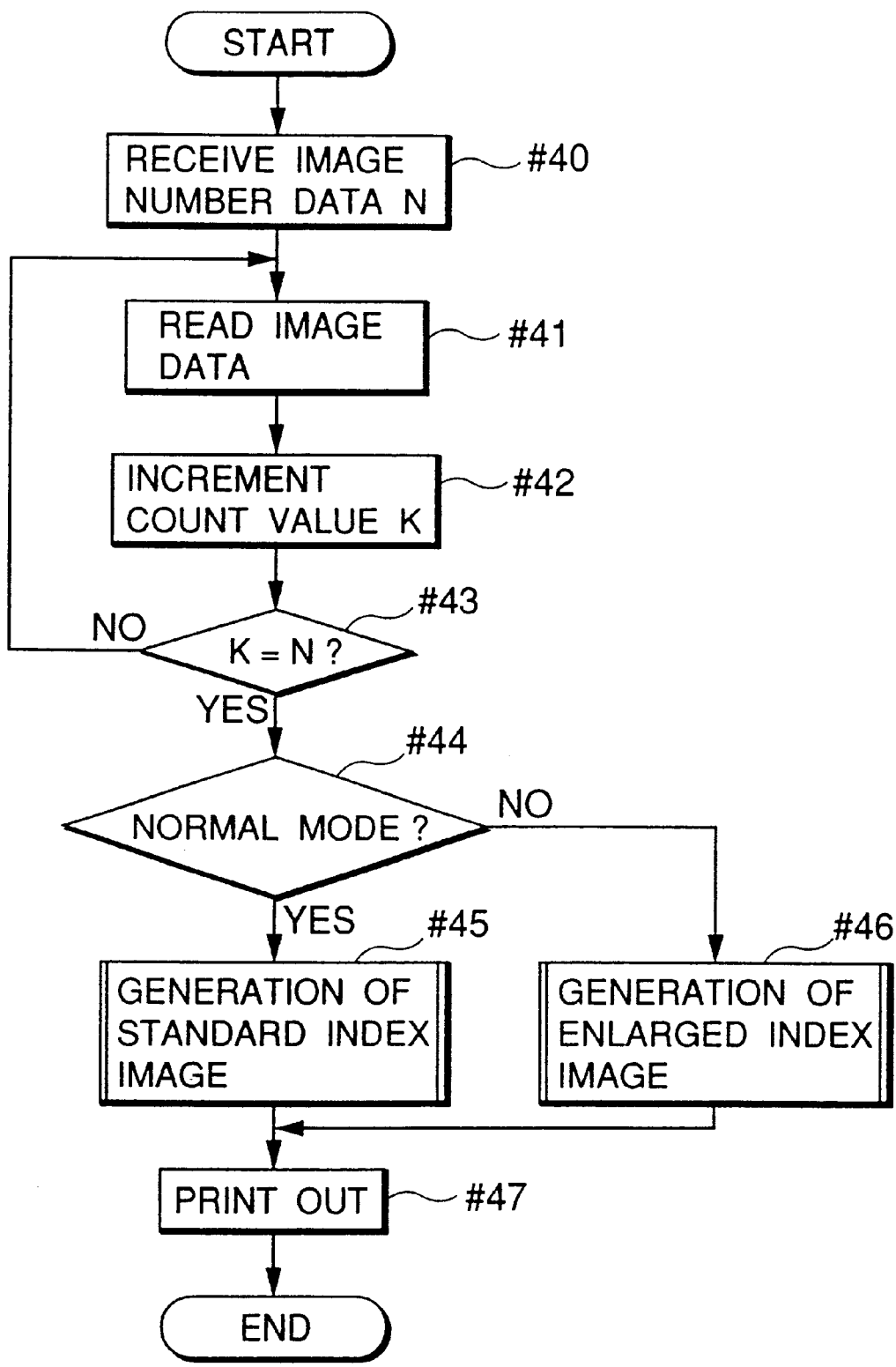
FIGS. 15 and 16 are flowcharts showing an image processing of the second image forming system.

FIG. 15 shows an image processing of the image forming system of the second image forming system. The operation steps shown in FIG. 15 are basically identical to those of FIG. 4. Unlike the flowchart of FIG. 4 in which the total number of frames N recorded in the film 7 is read and the reading of the frame images is controlled based on the read total number of frames N, data of an image number N sent from the image generator unit 12 is received and the reception of the images sent from the image generator unit 12 is controlled based on this received data in the flowchart of FIG. 15. Since operations in Steps #44 to #47 are identical to those in Steps #5 to #8, only operations in Steps #40 to #43 are described here.

First, the data of the image number N sent from the image generator unit 12 is received (Step #40). Subsequently, the image data sent from the image generator unit 12 are successively read (Steps #41 to #43). Specifically, the system controller 5 increments the count value of the frame number counter K by one each time receiving the image data (Step #42), and discriminates whether the count value K has reached the image number N (Step #43). The system controller 5 receives the image data until the count value K reaches the image number N (a loop of Steps #41 to #43).

When the count value K reaches the image number N, this routine proceeds to Step #44 to generate a specified index image.

In Step #42, the count value of the frame number counter K which is initially set at the image number N may be decremented by one each time receiving the image data. Although the number data N of the images to be combined is transferred at first in the flowchart of FIG. 15, the number of the images may be counted each time they are received from the image generator unit 12, so that the number N of the images to be combined can be determined by receiving an image transfer end signal from the image generator unit 12.

Figure 16:
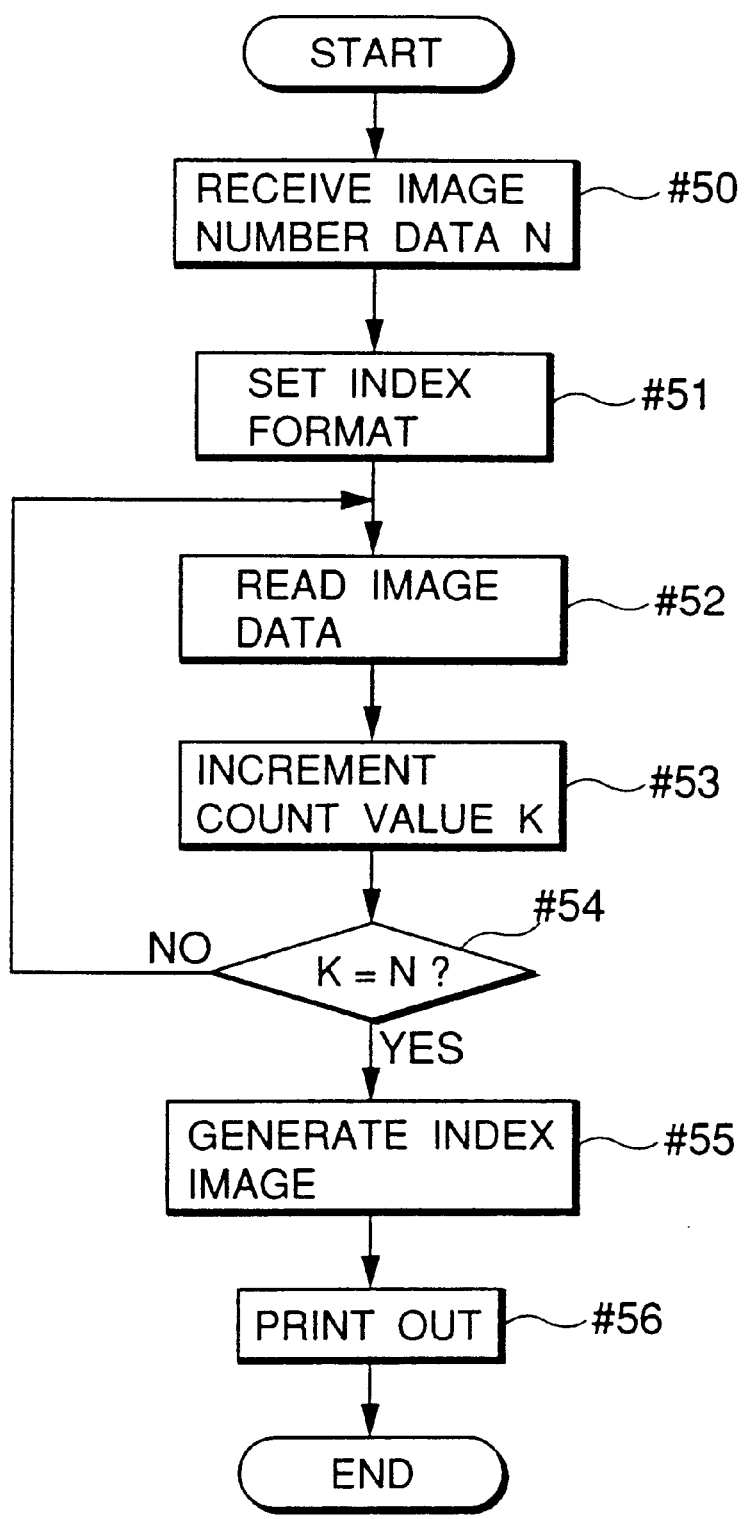

With a plurality of images inputted from the image generator unit 12, there can be generated an index image in which enlarged display location(s) is/are partially provided. In this case, there is no concept of considering the number of missing images to the total number of images as the unexposed frame numbers n to the total number of frames N. Accordingly, index formats having the array patterns of FIGS. 10, 12, 13 are prepared, and a specified index format is set in accordance with the image number N inputted from the image generator unit 12 as shown in the flowchart of FIG. 16 (Steps #50, #51). The index image can be generated by arraying the images inputted from the image generator unit 12 in a matrix manner in accordance with the set index format (Steps #52 to #56).

Although the image processor unit 3 is an independent element of the image forming system in this embodiment, it may be built in the image generator unit 12 such as the film scanner unit 2 or a computer, or an image output device such as the printer unit 4, a CRT or like display device 9 or a facsimile 10, thereby realizing the image generator unit or the image output device having an index image generating function.

Figure 17:
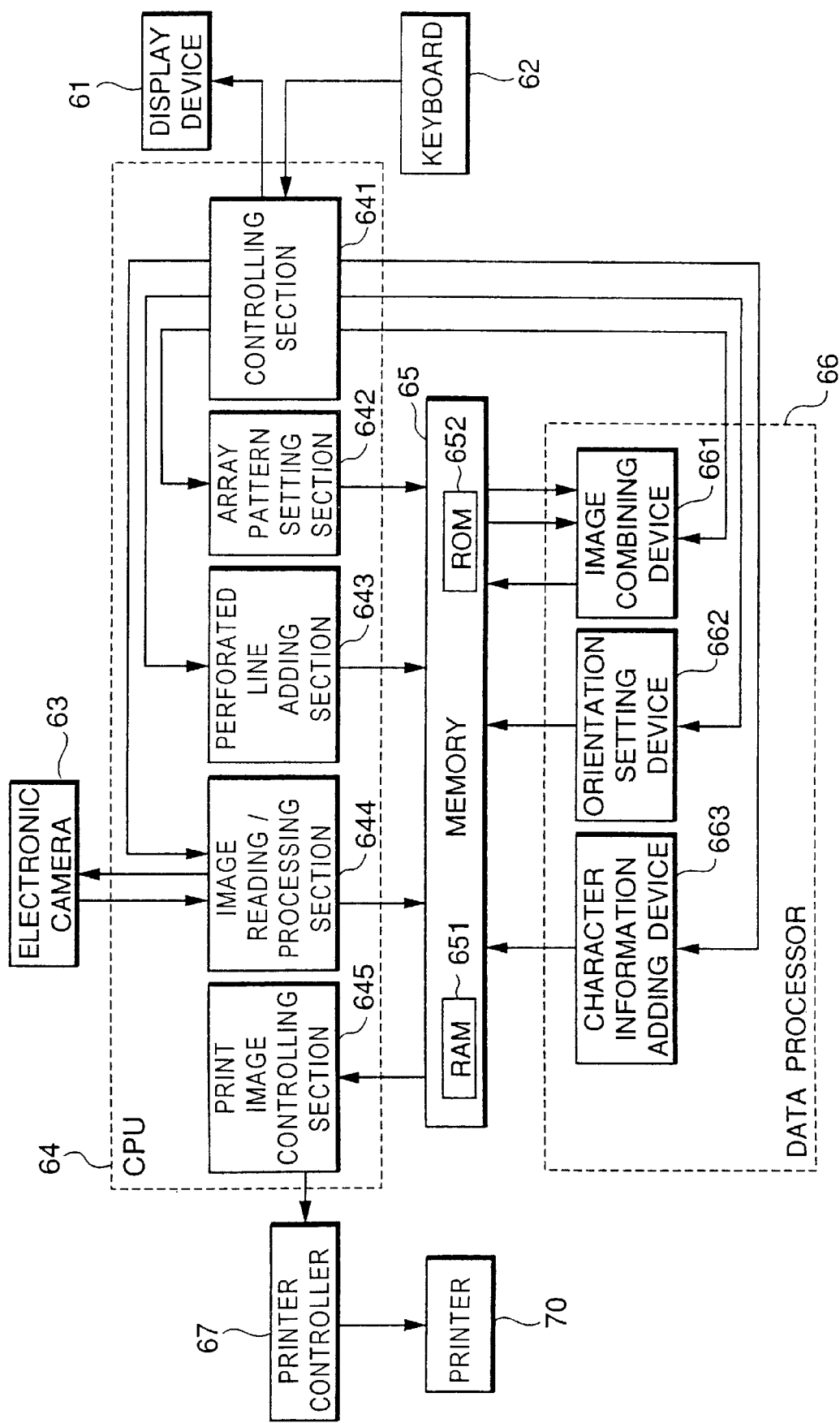
FIG. 17 is a schematic diagram showing a construction of a third image forming system embodying the invention.

FIG. 17 is a schematic diagram showing a construction of a third image forming system embodying the invention. This image forming system includes a display device 61, a keyboard 62, an electronic camera 63, a CPU 64, a memory 65, a data processor 66, a printer controller 67 and a printer 70.

The display device 61 includes a CRT, a liquid crystal display panel or the like, and is adapted to display selection menus using characters and graphics.

The keyboard 62 is used, for example, to designate an item from the selection menu displayed on the display device 61. Instead of the keyboard 62, a mouse may be used to designate a desired item of the selection menu by moving a pointer displayed together with the selection menu on the screen of the display device 61 to an item of the selection menu and by clicking it. Alternatively, there may be used a touch panel which is mounted on the display screen of the display device 61 to designate a location.

The electronic camera 63 is used to pick up an object image by sensing an object by an image pickup device such as CCD. In addition to the electronic camera 63 as the image reader, a scanner may be provided to read an image such as a picture image.

The CPU 64 centrally controls the print output system, and includes a selection designation controlling section 641, an array pattern setting section 642, a perforated line adding section 643, an image reading/processing section 644 and a print image controlling section 645.

Figure 18A:
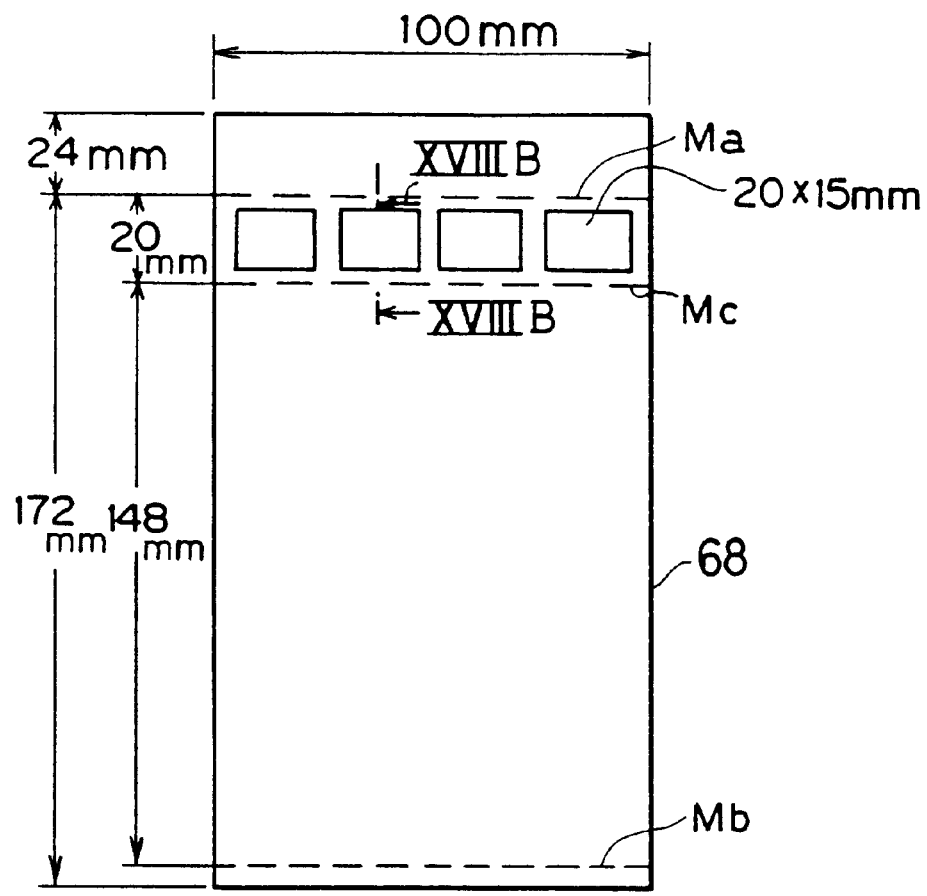
FIG. 18A is a diagram showing an array pattern in which frames of two different sizes, small and large sizes, are arrayed.
Figure 18B:
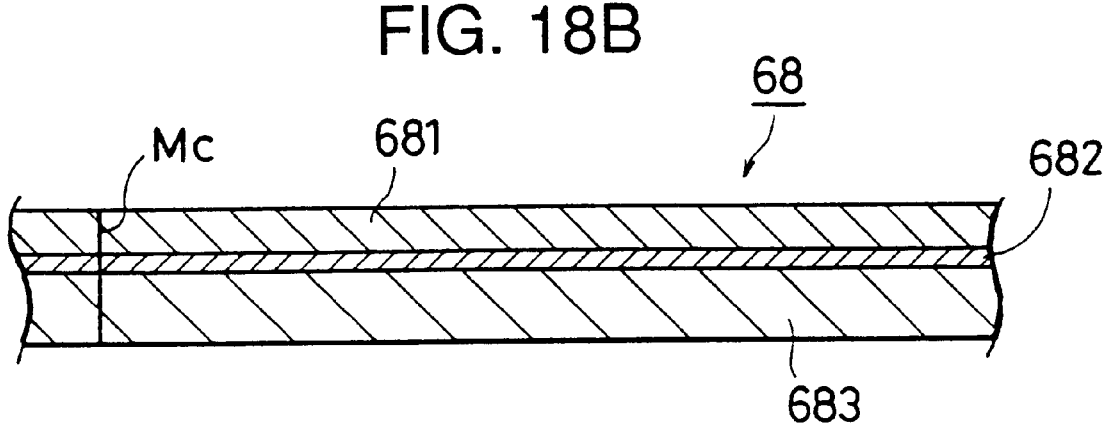
FIG. 18B is a section view taken along the line XVIIIB—XVIIIB of FIG. 18A.

FIG. 18A is a diagram showing an array pattern in which frames of two sizes: small and large, are arrayed, and FIG. 18B is a section view taken along XVIIIB—XVIIIB of FIG.

Figure 19:
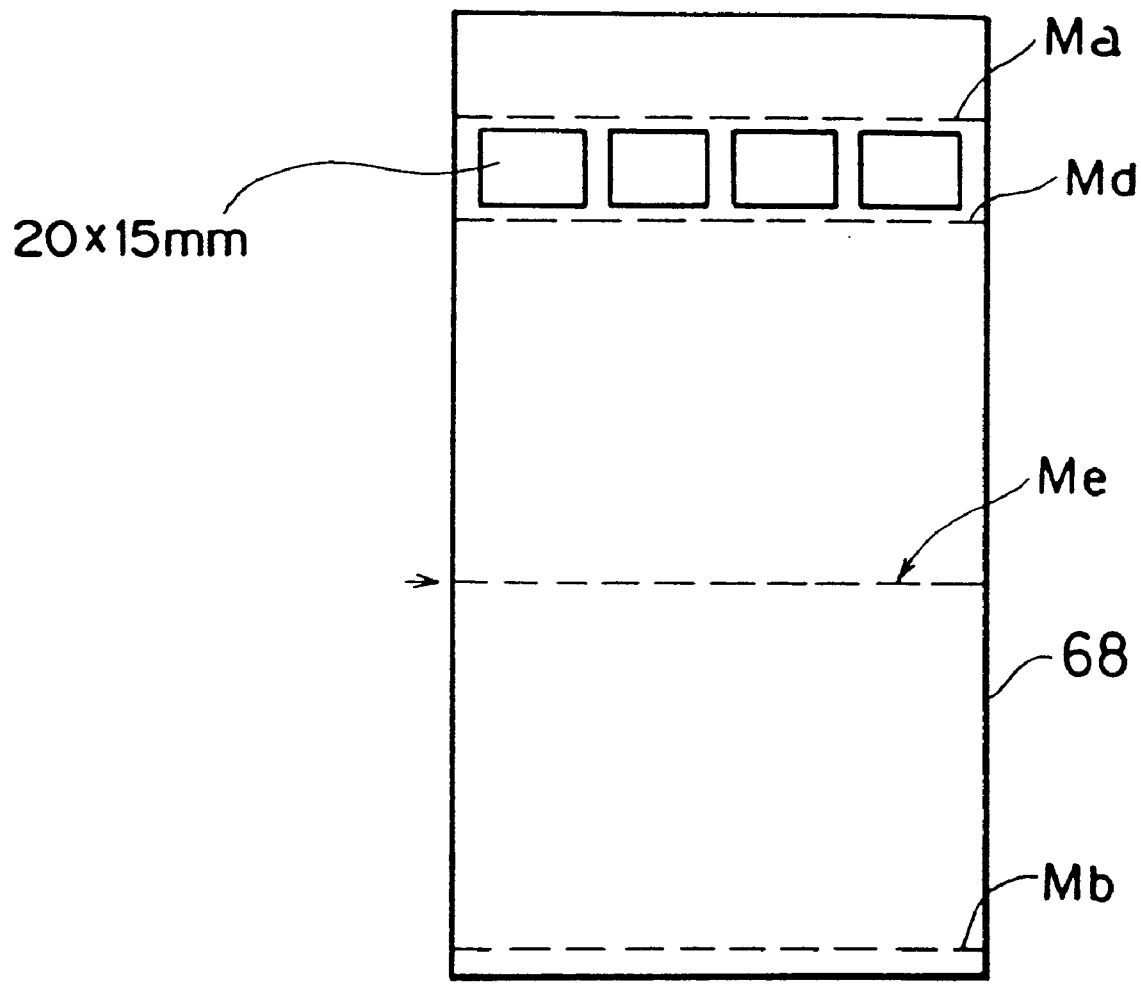
FIG. 19 is a diagram showing another array pattern in which frames of two different sizes, small and large sizes, are arrayed.
Figure 20:
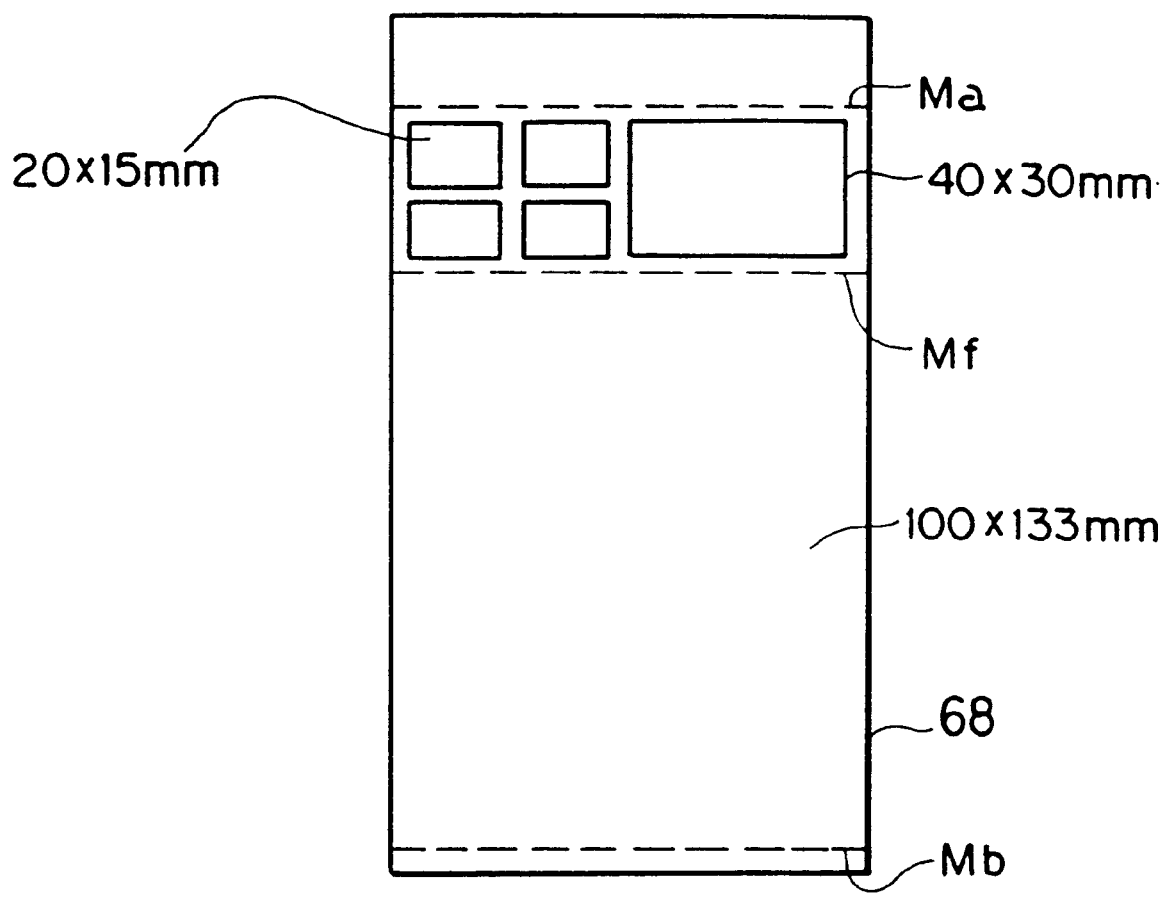
FIG. 20 is a diagram showing an array pattern in which frames of three different sizes, small, medium and large sizes, are arrayed.

18A. FIG. 19 is a diagram showing another array pattern in which frames of two sizes: small and large, are arrayed, and FIG. 20 is a diagram showing an array pattern in which frames of three sizes: small, medium and large, are arrayed. In this embodiment, a seal print sheet 68 is used which is of 100×172 mm and has a front sheet layer 681 or a recording layer on which images are to be printed, an adhesive layer 682 and a pasteboard 683 or a base layer. In the seal print sheet 68, the so-called perforated lines Ma, Mb or separation are formed at front and rear sides of the frames in advance for easy separation.

In addition to these perforated lines, a perforated line Mc, perforated lines Md, Me and a perforated line Mf may be added if necessary in layouts of FIGS. 18A, 19 and 20, respectively. By providing the perforated lines, the seal print sheet 68 which, for example, still has frame seals of small size after a frame seal of large size is used can be easily kept.

Three array patterns shown in FIGS. 18A to 20 are described. In the array pattern of FIG. 18A, four frame images of 20×15 mm are aligned side by side in an upper portion, and one frame image of a postcard size (100×148 mm) is arranged therebelow. In the array pattern of FIG. 19, four frame images of 20×15 mm are aligned side by side in an upper stage, and two frame images of ½ postcard size are arranged in middle and lower stages. In the array pattern of FIG. 20, four frame images of 20×15 mm are arrayed at an upper left side; one frame image of 40×30 mm (ID photo size) is arranged at an upper right side; and one frame image of 100×133 mm is arranged below. These array patterns are stored in the memory 65 in advance.

The selection designation controller 641 shown in FIG. 17 causes the array patterns shown in FIGS. 18A to 20 to be displayed as a selection menu on the display device 61 and controls the display device 61 so that a desired item can be designated via the keyboard 62.

The selection designation controller 641 causes selection menus for designating the addition of a perforated line to the seal print sheet 68, the photographing by the electronic camera 63, the image combining, the orientation of the image, and the addition of desired characters to be displayed on the display device 61, in addition to the selection menu for designating the three kinds of array patterns. Further, when the execution of the photographing is designated, a selection menu for the enlargement of the photographed images is displayed.

Figure 21:
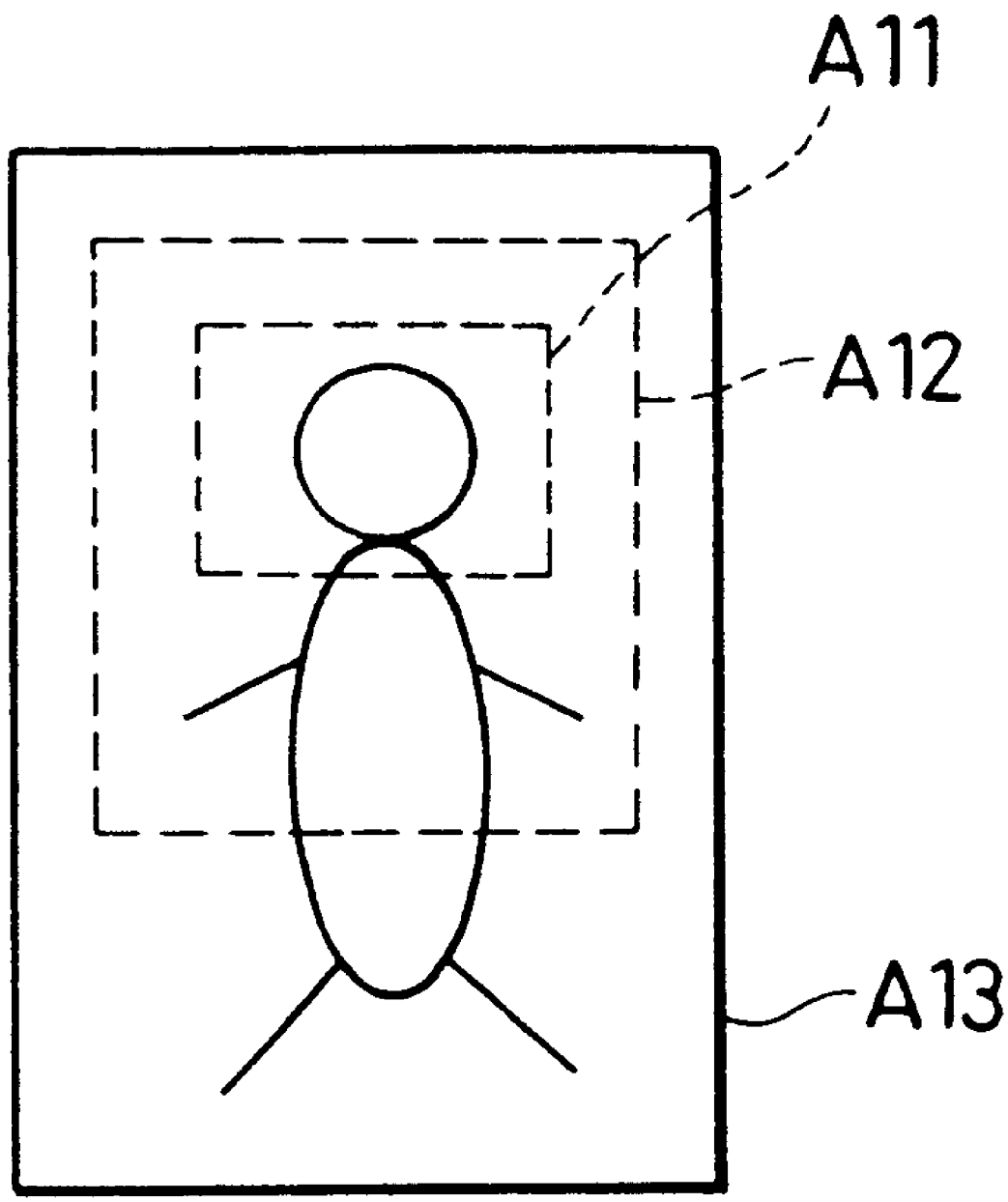
FIG. 21 is a diagram showing different kinds of enlargement areas of a photographed image.
Figure 22A:
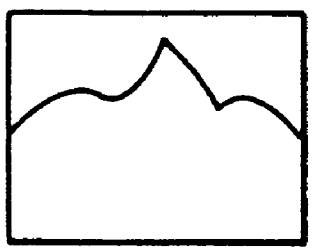
FIGS. 22A to 22F are diagrams showing examples of a background image.
Figure 22B:
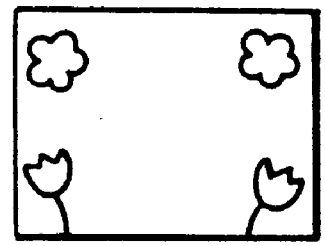
Figure 22C:
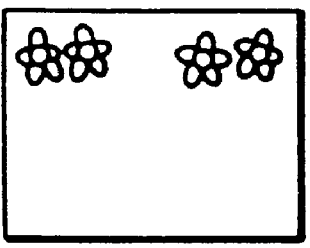
Figure 22D:
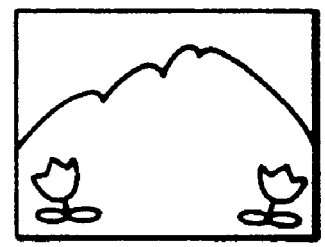
Figure 22E:
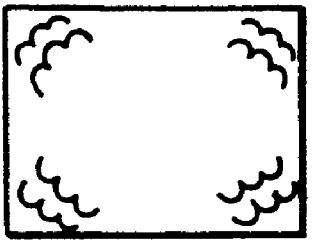
Figure 22F:
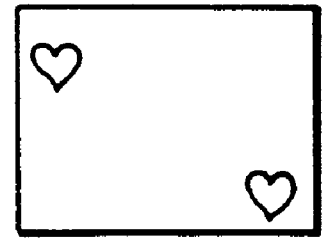

FIG. 21 is a diagram showing different kinds of enlargement areas of a photographed image. The selection designation controller 641 causes the selection menu used to designate which one of areas A11, A12, A13 of a photographed image displayed on the display device 61 is to be enlarged to be displayed on the display device 61. Further, a desired one of a plurality of enlargement ratios can be designated with this selection menu. Instead of this, a desired enlargement ratio may be numerically inputted via the keyboard 62. Since images can be printed not only on frames of small size, but also on frames of large size in this embodiment, the image within the area A13 can be enlarged at a desired enlargement ratio.

The array pattern setting device 642 is adapted to set an array pattern designated via the keyboard 62 in the seal print sheet 68. If no array pattern is designated within a predetermined time, the array pattern of, e.g. FIG. 18A may be automatically set.

The perforated line addition setting device 643 designates the addition or no addition of perforated line(s) to the seal print sheet 68 in accordance with an instruction given via the keyboard 62. Upon the designation of the addition of perforated line(s), the addition of the perforated line Mc is set when the array pattern of FIG. 18A is set; the addition of the perforated lines Md, Me is set when the array pattern of FIG. 19 is set; and the addition of the perforated line Mf is set when the array pattern of FIG. 20 is set. Instead of designating the addition of the perforated line(s), the perforated lines Mc to Mf may be automatically set according to the array pattern. Instead of forming the perforated lines Ma, Mb in advance, the addition of these perforated line may be designated or automatically set.

The image reading/processing device 644 causes the electronic camera 63 to perform the photographing upon receiving a photographing instruction from the keyboard 62, and enlarges a photographed image upon receiving a photographed image enlarging instruction from the keyboard 62. The photographed image and the enlarged image are temporarily stored in the memory 65 for the editing such as the combining of the image as described later.

The number of the photographing performed by the electronic camera 63 is at maximum equal to the number of frames: up to 5 times in the case of FIG. 18A and up to 6 times in the cases of FIGS. 19 and 20. Instead of this, the number of the photographing may be designated a number of times which is equal to the number of the frame size types: up to twice in the cases of FIGS. 18A and 19 and up to three times in the case of FIG. 20.

The memory 65 includes a RAM 651 for temporarily storing the contents and images designated via the keyboard 62 and a ROM 652 for storing three formats of the array pattern, the locations of the perforated lines corresponding to the array patterns, and data including six background images shown in FIG. 22 in advance.

The data processor 66 shown in FIG. 17 includes an image combining device 661, an orientation setting device 662 and a character information adding device 663.

Figure 23:
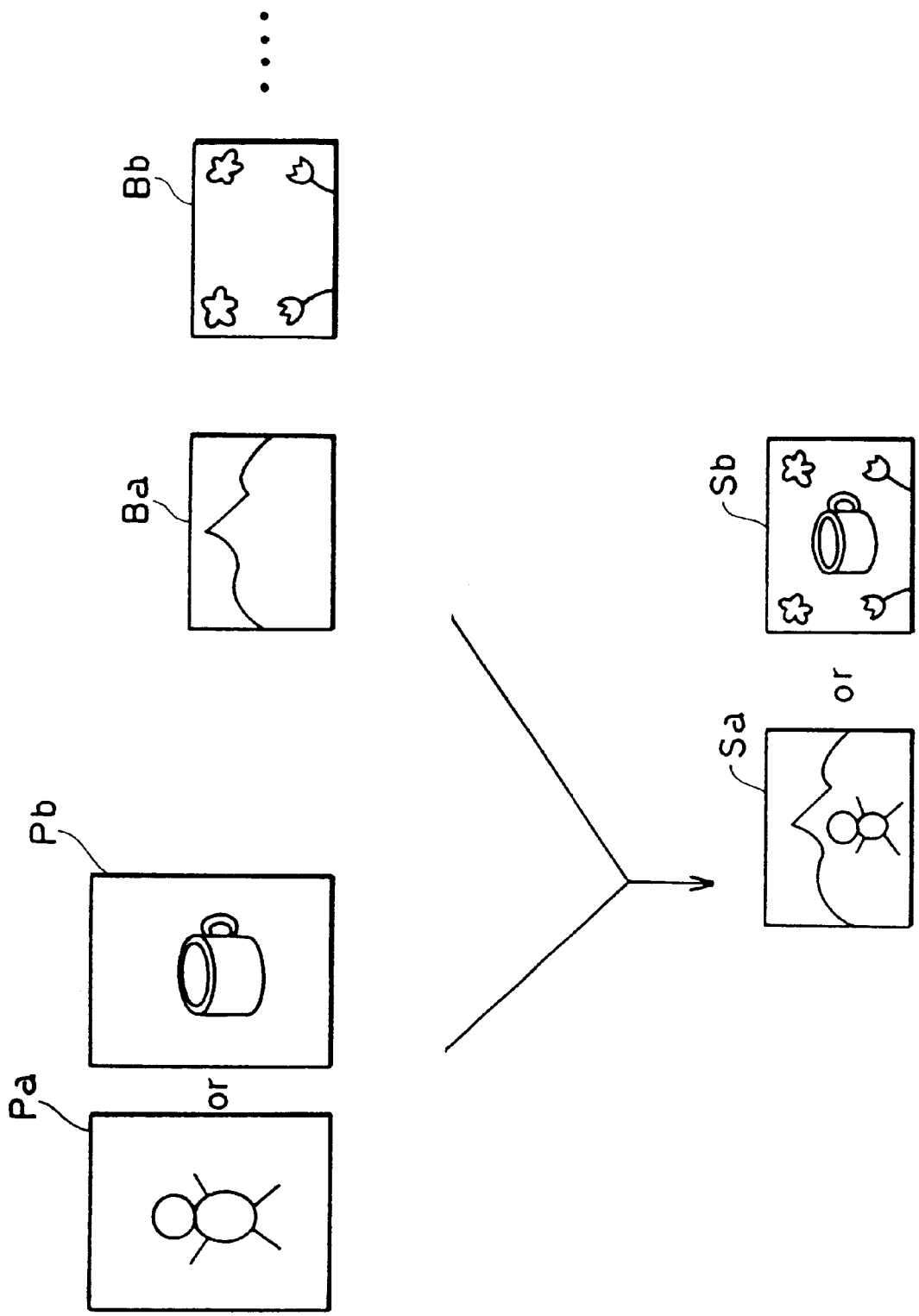
FIG. 23 is a diagram showing examples of a combined image.

FIG. 23 is a diagram showing examples of the image combining.

The image combining device 661 combines the photographed image with any one of the background images (see FIGS. 22A–22F) stored in the memory 65 according to the image combining instruction from the keyboard 62 to generate a combined image. In an example of FIG. 23, a combined image Sa is obtained by combining a photographed person image Pa and a background image Ba, and a combined image Sb is obtained by combining an object image Pb and a background image Bb. The image combining device 661 uses only either one of the photographed image and the background image according to the instruction from the keyboard 62. Further, the image (the combined image or either the photographed image or background image) obtained by the image editing is stored in the RAM 651 as a frame image to be printed.

The image combining device 661 sets any one of a plurality of types of frame sizes for the image obtained by the image editing according to the selection of the user. Specifically, an order of the image editing is predetermined for a plurality of frames. For example, for the array pattern of FIG. 18A, the image editing is performed one by one to the four frames in the upper stage from the left end, and then to the frame of large size arranged below. Accordingly, the small size is designated for the images of first four frames, and the large size is designated for the image of the last frame.

FIGS. 24A and 24B are diagrams showing examples of images to be printed according to whether they are horizontally or vertically framed. The orientation setting device 662 sets the content of designation: horizontally framed (see FIG. 24A) or vertically framed (see FIG. 24B), for the frame image according to the orientation instruction from the keyboard 62. The set content of the orientation is stored in the memory 65.

The character information adding device 663 sets characters to be added to the respective images according to a character addition instruction from the keyboard 62. For example, when a name of a person is inputted via the keyboard 62, this name is added, for example, at a right side below the image to be printed.

The print image generator 645 generates an image to be printed on the seal print sheet 68 in accordance with the set contents. The printer controller 67 controls the printer 70.

Figure 25:
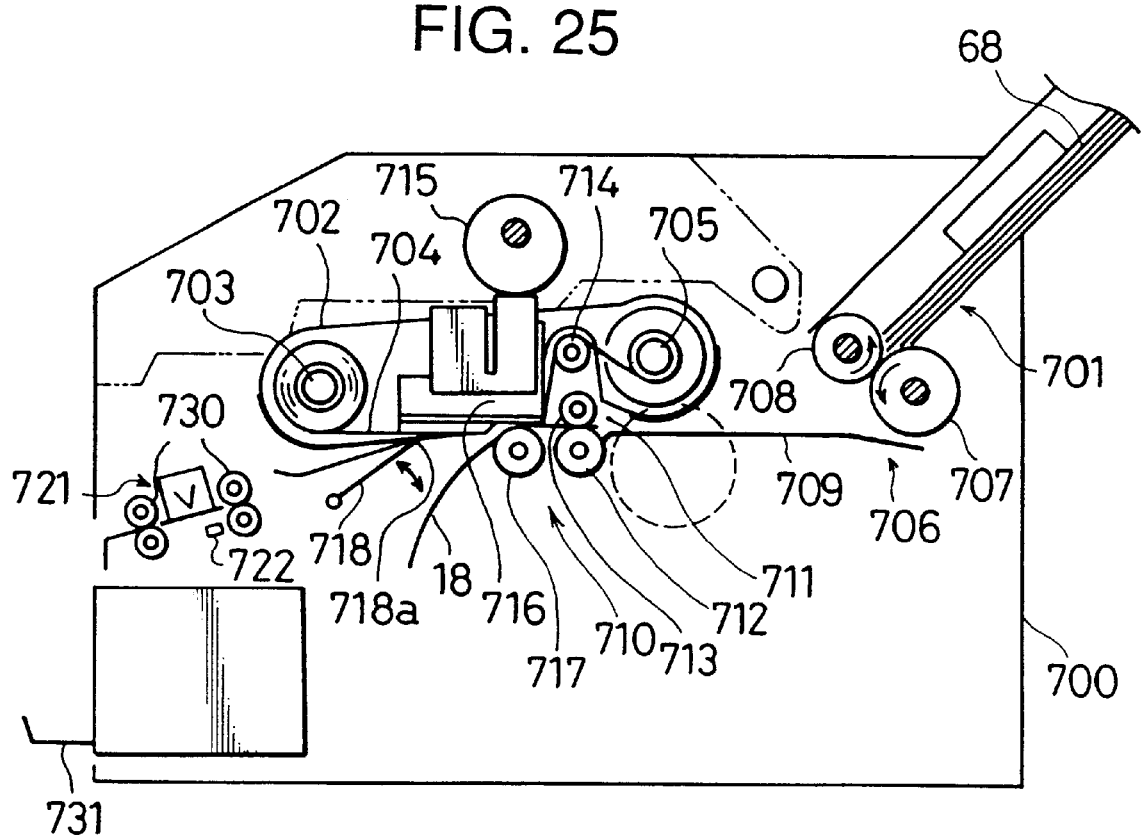
FIG. 25 is a schematic diagram showing a section of a printer.
Figure 26:
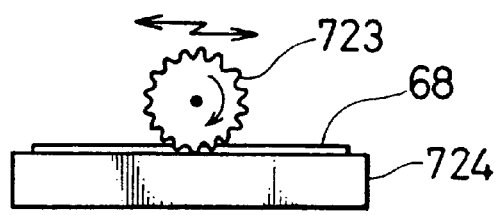
FIG. 26 is a diagram showing a knurled cutter when viewed from a discharge side of the printer.

FIG. 25 is a schematic section of the printer 70, and FIG. 26 is a diagram of a knurled cutter viewed from a discharge side of the printer 70.

The printer 70 is a thermal transfer type. A sheet bin 701 for containing a plurality of seal print sheets 68 is detachably mountable on the printer 70, and an ink film cassette 702 is detachably mountable substantially in the middle of the printer 70. The ink film cassette 702 contains an ink film 704 in which a multitude of units are continuously formed, each unit including strip-shaped thermal sublimation ink layers of three colors: yellow, magenta and cyan, and an overcoating. The ink film 704 is wound around a feed reel 703, and is taken up by a take-up reel 705.

A feeding assembly 706 includes a feed roller 707, a separating roller 708 and a guide member 709. The seal print sheets 68 contained in the sheet bin 701 are dispensed one by one while being separated from each other, and are fed to a printing assembly along the guide member 709.

The printing assembly 710 includes a rear end sensor 711, a grip roller 712, a pinch roller 713, an ink film take-up roller 714, an eccentric cam 715, a thermal head 716, a platen roller 717, etc. and is adapted to form images of yellow, magenta and cyan on the seal print sheet 68 and apply an overcoating thereto.

At a downstream side of the printing assembly 710 with respect to a sheet feeding direction is arranged a knurling device 721 for forming a perforated line in the printed seal print sheet 68 in a direction normal to the sheet feeding direction in accordance with a command from the printer controller 67. The knurling device 721 includes a sheet sensor 722 for detecting a feed of the printed seal print sheet 68 to the knurling device 721, a knurled cutter 723 for forming the perforated line, and a rubber base 724 for the knurled cutter 723. A discharge roller 730 discharges the printed seal print sheet 68 to a discharge bin 731 arranged outside. A location where the perforated line is to be made is detected by counting the number of drive pulses of a pulse motor after the detection of the feed of the sheet 68 by the sheet sensor 722.

The knurling device 721 is provided, as a moving mechanism of the knurled cutter 723, with, e.g. a rotatable shaft supported in a direction normal to the sheet feeding direction of the seal print sheet 68 and formed with a spiral groove, and a holder having a projection engageable with the spiral groove. The knurled cutter 723 is rotatably supported on this holder. Accordingly, the knurled cutter 723 follows the holder which moves as the rotatable shaft is rotated, and moves in such a direction as to cross the seal print sheet 68 while rotating. The rotatable shaft may be provided with another holder on which the knurled cutter 723 is supported in a direction normal to the sheet feeding direction, so as to enable the formation of a perforated line along the feeding direction of the seal print sheet 68 (see perforated lines Cc, Cj of FIGS. 34, 36 to be described later).

The operation of the printing assembly 710 will be described.

Upon being fed to the printing assembly 710 by the feeding assembly 706, the seal print sheet 68 is fed by the grip roller 712 and the pinch roller 713 until its rear end is detected by the rear end sensor 711.

Simultaneously with this feeding operation, the ink film 704 is dispensed to the take-up reel 705 while being pulled from the feed reel 703 by the ink film take-up roller 714 in order to locate a first yellow ink in a specified location.

Subsequently, after the eccentric cam 715 is rotated to bring the thermal head 716 into pressing contact with the platen roller 717, the seal print sheet 68 is fed in a reverse direction by the rotation of the grip roller 712. Printing is started upon the detection of the rear end of the seal print sheet 68 by the rear end sensor 711, thereby forming a yellow image on the front surface 681 of the seal print sheet 68. Magenta and cyan images are similarly formed. Subsequently, after the overcoating is applied, a leading end 718a of a pivotal guide 718 is lowered to feed the seal print sheet 68 toward the knurling device 721.

Next, the operation of the print output system will be described.

Figure 27:
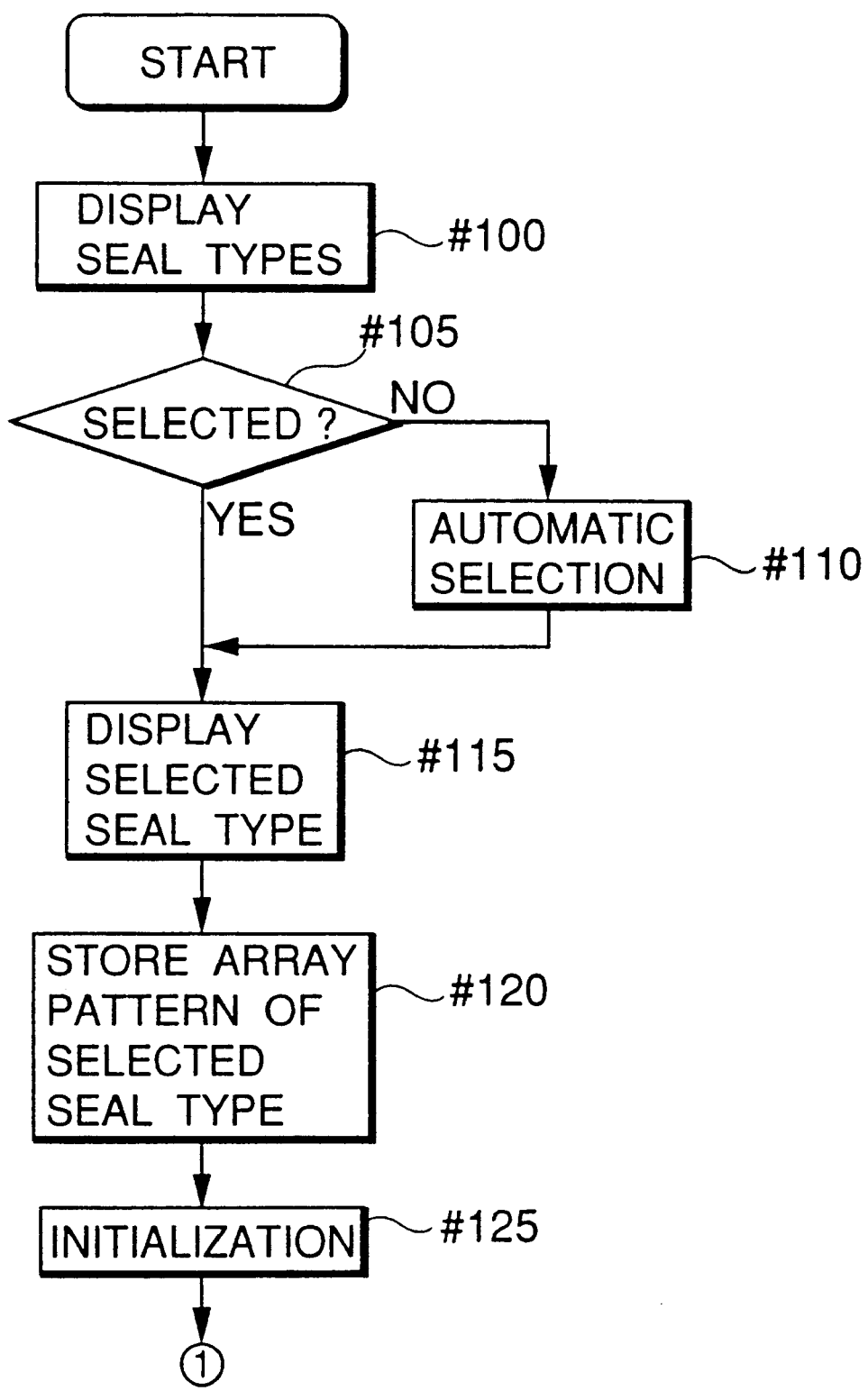
FIG. 27 is a flowchart showing an array pattern setting control.
Figure 28:
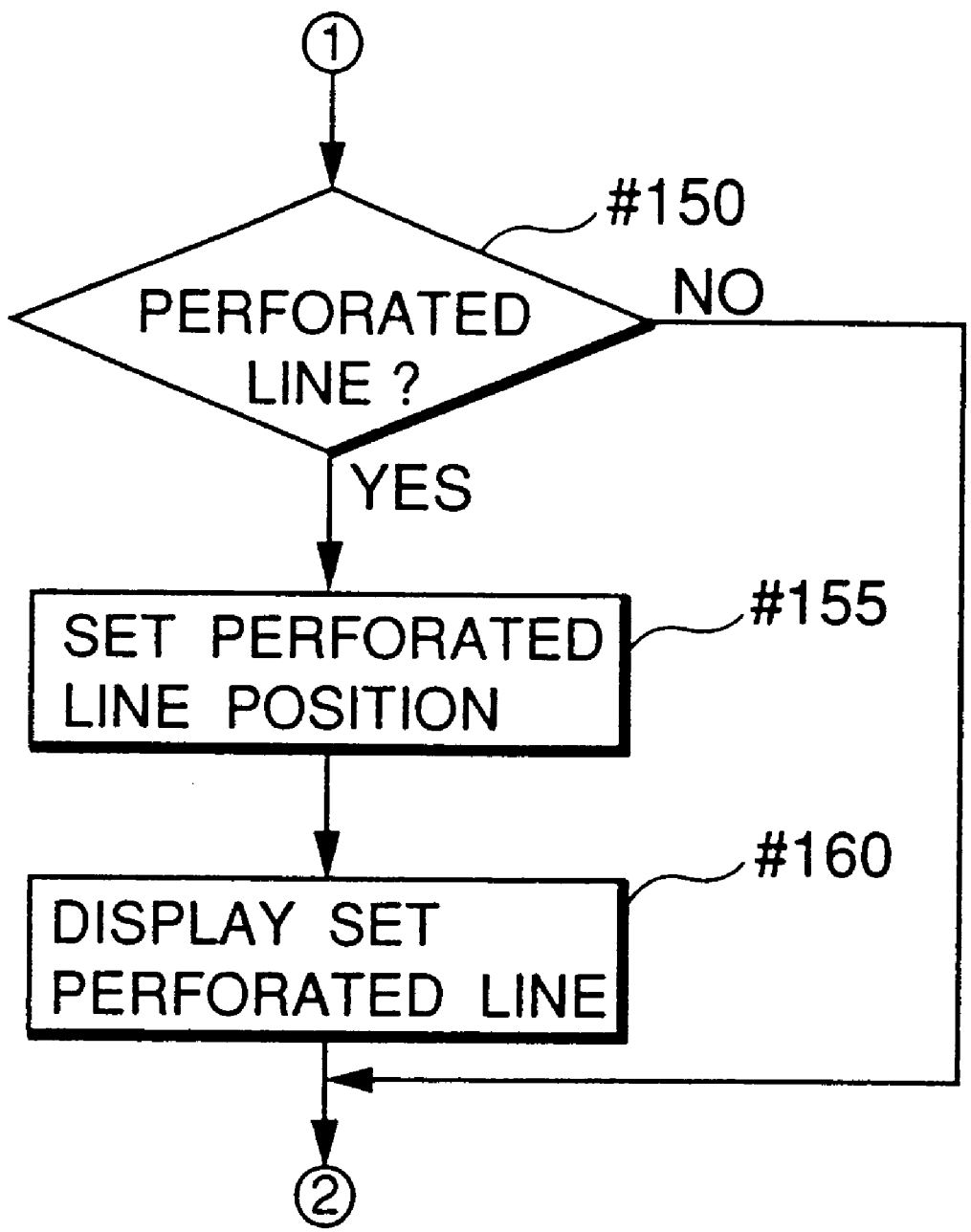
FIG. 28 is a flowchart showing a perforated line addition setting control.
Figure 29:
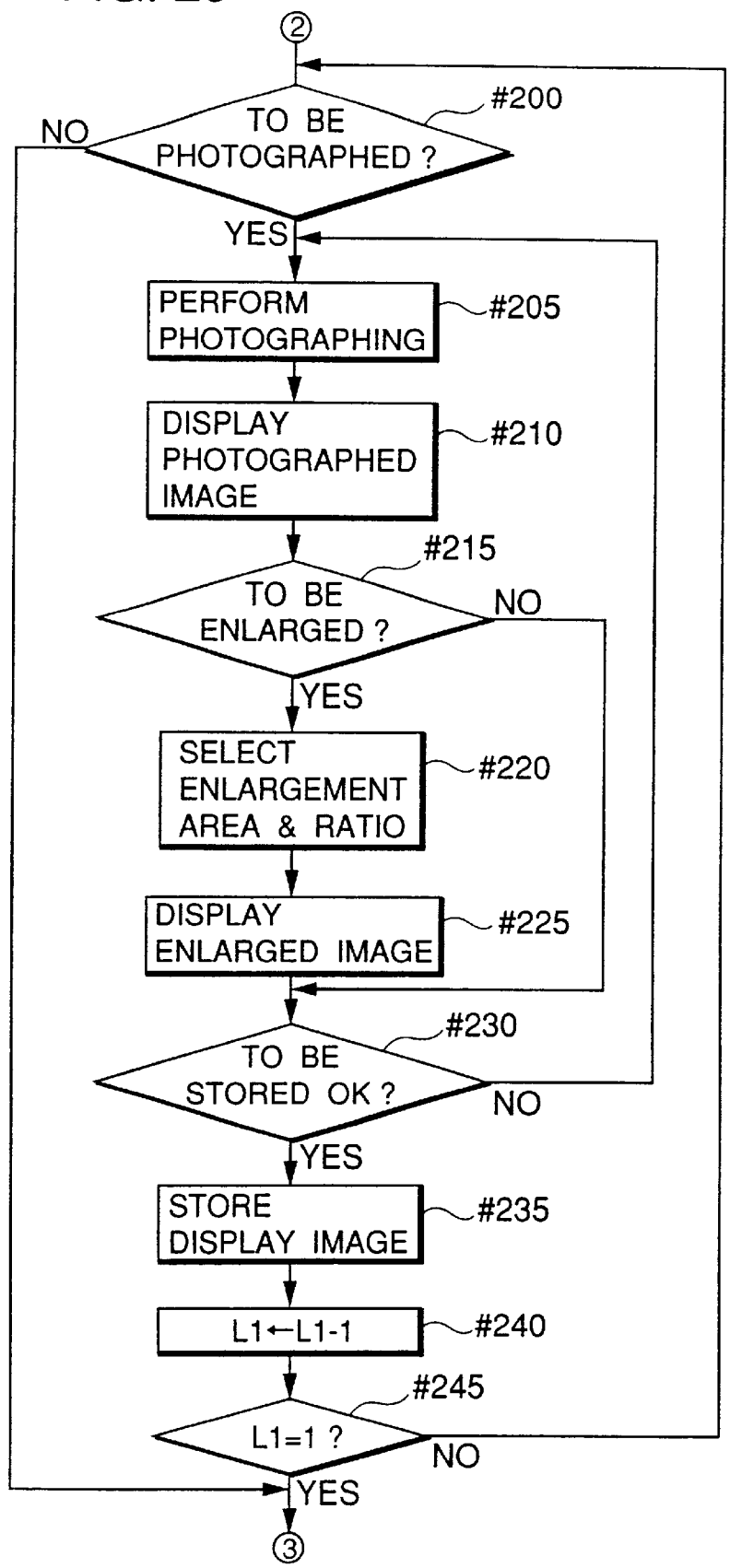
FIG. 29 is a flowchart showing a photographing control.
Figure 30:
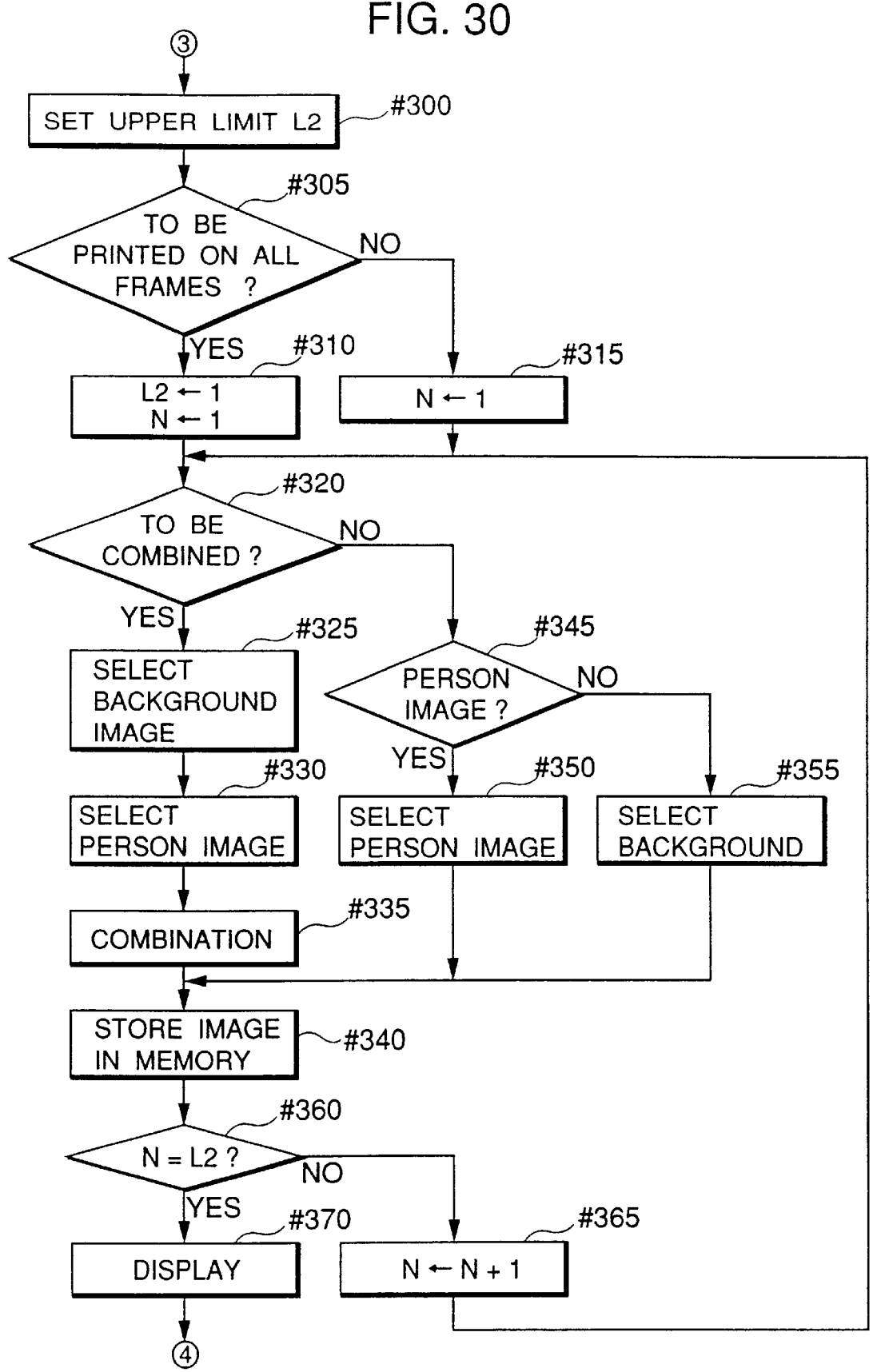
FIG. 30 is a flowchart showing an image combining control.
Figure 31:
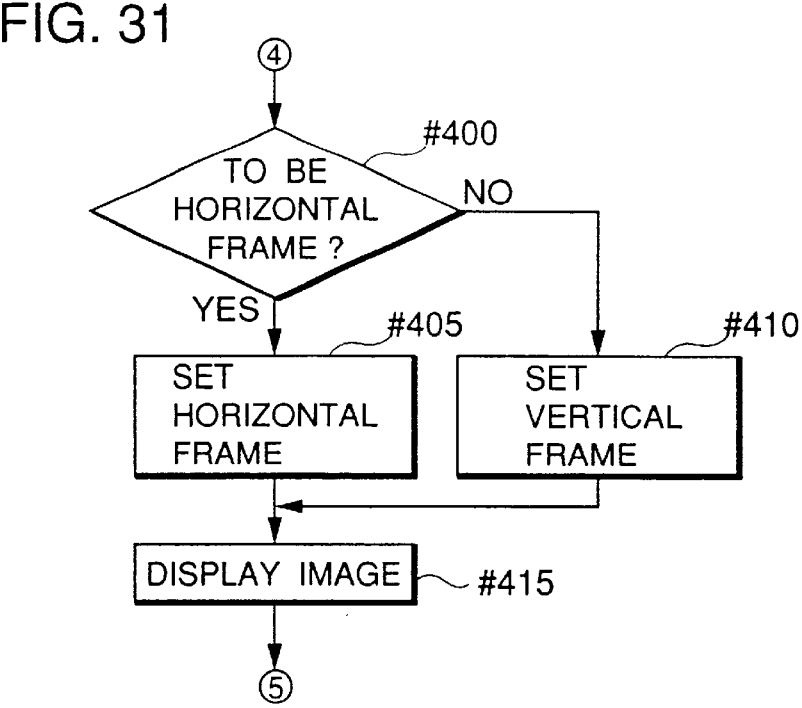
FIG. 31 is a flowchart showing an orientation setting control.
Figure 32:
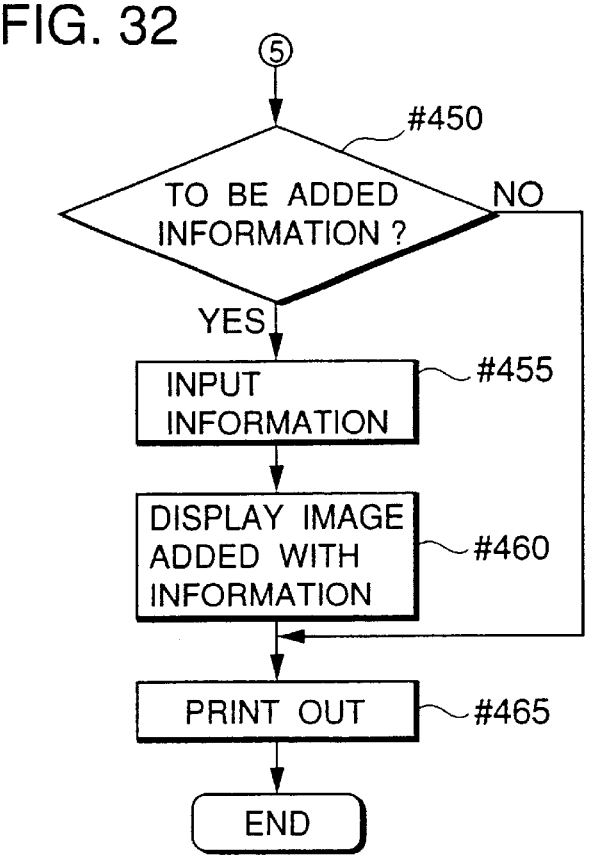
FIG. 32 is a flowchart showing an added information setting control.

FIGS. 27 to 32 show the operation of the print output system, wherein FIG. 27 is a flowchart for an array pattern setting control, FIG. 28 is a flowchart for a perforated line addition setting control, FIG. 29 is a flowchart for a photographing control, FIG. 30 is a flowchart for an image combining control, FIG. 31 is a flowchart for an orientation setting control and FIG. 32 is a flowchart for an added information setting control.

Upon the start of the processing by this flowchart, seal types or array patterns are displayed on the display device 61 as pictures or the like so as to enable the selection of any one of three array patterns (see FIGS. 18A, 19, 20).

Thereafter, it is discriminated whether a seal type has been selected within a predetermined time (Step #105). The selected seal type is set if the seal type has been selected (YES in Step #105), and the seal type of the array pattern shown in FIG. 18A is automatically selected (Step #110) unless otherwise (NO in Step #105). Then, only the selected seal type is displayed on the display device 61 (Step #115).

Subsequently, the array pattern of the seal type selected for the seal print sheet 68 is stored in the RAM 651 (Step #120). Thereafter, initialization is performed (Step #125). In this initialization, for example, an upper limit value L1 for the number of photographing is set at "5" in the case of FIG. 18A and "6" in the cases of FIGS. 19 and 20.

Subsequently, the routine proceeds to $\hat{1}$ of FIG. 28, while the selected seal type is displayed, a question "IS A PERFORATED LINE TO BE ADDED ?" and a selection menu relating to this question are displayed (Step #150). If perforated lines are to be added (YES in Step #150), the locations of perforated lines corresponding to the set array pattern are set for the seal print sheet 68 (Step #155), and this set content is stored in the RAM 651. Thereafter, the set perforated lines are superimposed in locations corresponding to the seal type displayed on the display device 61 (Step #160). On the other hand, if no perforated line is to be added (NO in Step #150), Steps #155 and #160 are skipped.

Subsequently, the routine proceeds to $\hat{2}$ of FIG. 29, and a question "IS PHOTOGRAPHING TO BE PERFORMED ?"

and a selection menu relating to this question are displayed (Step #200). If photographing is to be performed (YES in Step #200), photographing by the electronic camera 63 is performed (Step #205). Thereafter, the obtained photographed image is displayed on the display device 61 (Step #210). At this time, it may be made possible to designate which of person(s) or object(s) is/are to be photographed, and the photographing conditions may be changed according to the set contents.

Subsequently, a question "IS IMAGE TO BE ENLARGED ?" and a selection menu relating to this question are displayed (Step #215). If the image is to be enlarged (YES in Step #215), the areas A11 to A13 shown in FIG. 21 and a plurality of enlargement ratios are displayed on the display device 61 in such a manner that one area and one enlargement ratio can be selected, and the area to be enlarged and the enlargement ratio are determined by selecting them (Step #220). Thereafter, the photographed image within the determined area is displayed at the determined enlargement ratio (Step #225). On the other hand, if the image is not to be enlarged (NO in Step #215), the operations of Steps #220, #225 are skipped.

Subsequently, a question "IS IMAGE TO BE STORED ?" and a selection menu relating to this question are displayed (Step #230). If the image is not to be stored (NO in Step #230), this routine returns to Step #205. If the image is to be stored (YES in Step #230), the photographed image or the enlarged photographed image is stored in the RAM 651 and displayed on the display device 61 (Step #235).

Subsequently, the upper limit value L1 is decremented by "1" (Step #240) and it is discriminated whether the upper limit value L1 is equal to "1" (Step #245). This routine returns to Step #200 if L1≠ "1" (NO in Step #245). On the other hand, if the photographing is not designated in Step #200, the operations of Steps #205 to #245 are skipped. Accordingly, the number of the photographing is limited at maximum to the upper limit value L1. In other words, no more photographing is designated in Step #200 before the number of the photographing reaches the upper limit value L1, the image reading operation ends at that moment.

Subsequently, this routine proceeds to 3̂ of FIG. 30, "5" is set as the upper limit value L2 of the number of the editing for the image combining in the case of the array pattern of FIG. 18A and "6" is set in the cases of the array patterns of FIGS. 19 and 20 (Step #300).

Subsequently, a question "IS THE SAME IMAGE TO BE PRINTED ON ALL FRAMES ?" and a selection menu relating to this question are displayed (Step #305). If the same image is to be printed on all the frames (YES in Step #305), the upper limit value L2 is set at "1" in order to perform the image editing only once, and an initial value "1" is set in a counter N (Step #310). On the other hand, unless the same image is to be printed on all the frames (NO in Step #305), "1" is set in the counter N (Step #315).

The user is allowed to choose whether the same image is to be printed on all the frames in this routine. Alternatively, a processing for printing the same image not on all the frames may be automatically performed if a plurality of photographed images are stored in the flowchart of FIG. 29, whereas a processing for printing the same image on all the frames may be automatically performed if only one photographed image is stored therein.

Subsequently, a question "ARE IMAGES TO BE COMBINED ?" and a selection menu relating to this question are displayed (Step #320).

If the images are to be combined (YES in Step #320), the background images stored in the ROM 652 are selectably displayed on the display device 61 and one of the background images is selected (Step #325).

If a plurality of person images (photographed images) are stored in the RAM 651, those images are displayed as an index on the display device 61 so as to be selectable and one person image is selected. If there is one person image, this image is automatically assumed to be the person image to be combined (Step #330).

Thereafter, the selected background image and person image are combined (Step #335), and the combined image is stored in the RAM 651 as a frame image to be printed (Step #340).

On the other hand, if the images are not to be combined (NO in Step #320), a menu used to select one of the person image and the background image as an image to be printed is displayed (Step #345).

If the person image is selected as an image to be printed (YES in Step #345), the person images are selectably displayed on the display device 61 and one person image is selected. On the other hand, if there is only one person image, this person image is automatically selected (Step #350). Then, in Step #340, the selected person image is stored in the RAM 651 as a frame image to be printed.

On the other hand, if the background image is selected as an image to be printed (NO in Step #345), the background images are selectably displayed on the display device 61 and one background image is selected. On the other hand, if there is only one background image, this background image is automatically selected (Step #355). Then, in Step #340, the selected background image is stored in the RAM 651 as a frame image to be printed.

It is then discriminated whether the count value of the counter N is equal to the upper limit value L2 (Step #360). If N≠ L2 (NO in Step #360), the count value of the counter N is incremented by "1" (Step #365) and this routine returns to Step #320.

On the other hand, if N=L2(YES in Step #365), the images stored in the RAM 651 are read in an order of registration and displayed one by one from the above according to the selected array pattern (Step #370). For example, in the case of the array pattern of FIG. 18A, the images for the frames located above are displayed from the left, and then the frame image of the postcard size located below is displayed.

Subsequently, the routine proceeds to 4̂ of FIG. 31 and a question "IS IMAGE TO BE HORIZONTALLY FRAMED ?" and a selection menu concerning this question are displayed (Step #400). If the horizontal framing is selected (YES in Step #400), it is set (Step #405) and this set content is displayed on the display device 61 (Step #415). On the other hand, if the vertical framing is selected (NO in Step #400), it is set (Step #410) and this set content is displayed on the display device 61 (Step #415).

Subsequently, the routine proceeds to ⌢ of FIG. 32 and a question "IS ADDED INFORMATION TO BE INPUTTED ?" and a selection menu concerning this question are displayed (Step #450). If added information is to be inputted (YES in Step #450), the character information inputted via the keyboard 62 is written as added information in the RAM 651 (Step #455), and the print image to which this content is added is displayed (Step #460). On the other hand, if no added information is to be inputted (NO in Step #450), the operations of Steps #455, #460 are skipped.

Subsequently, the images are printed on the seal print sheet 68 in accordance with the image information to be printed thereon (Step #465).

Although the printer 70 includes the knurling device 709 in this embodiment, it may include a sheet cutting device instead. In this case, the portions of the perforated lines Ma, Mb shown in FIGS. 18A, 19 and 20 may be cut by this sheet cutting device.

Figure 33:
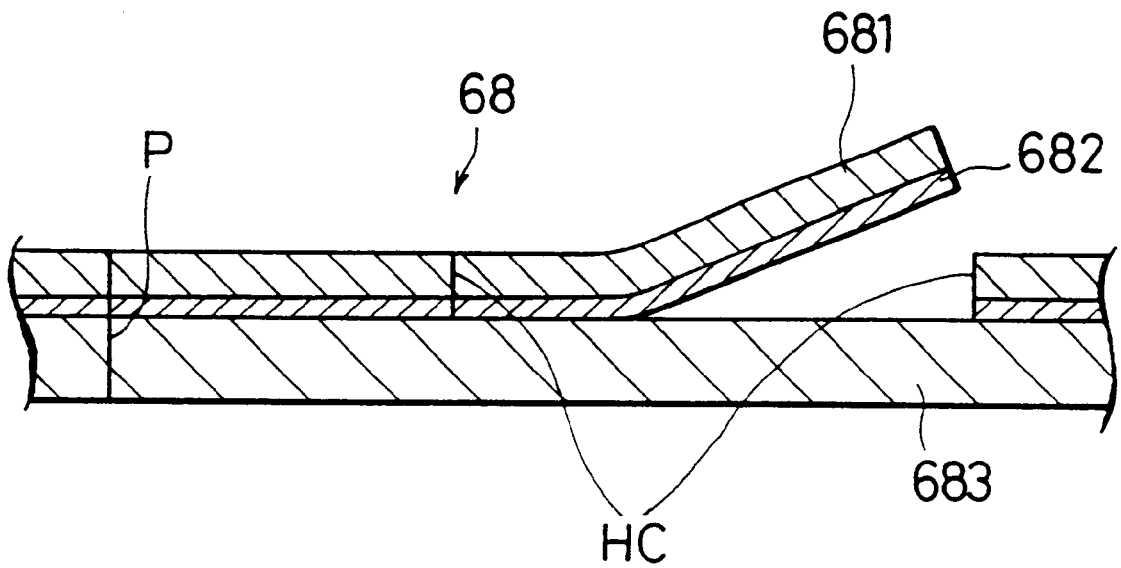
FIG. 33 is a section view of a seal print sheet having halfcuts.

Although the printer 70 includes one sheet bin 701 in this embodiment, it may include a plurality of sheet bins arranged in stages instead. In this case, seal print sheets having halfcuts (see FIG. 33) in conformity with the frames may be contained in the sheet bins for the respective array patterns, and the sheet bin corresponding to the selected array patter may be selected. At this time, the sheet bins may be distinguished based on their set locations or by reading the identification codes affixed to the sheet bins themselves.

Although a desired array pattern is selected from a plurality of array patterns in this embodiment, new array patterns may be defined by allowing the user to input, for example, the number by which the frame image of the postcard size shown in FIG. 18A is to be divided.

Figure 34:
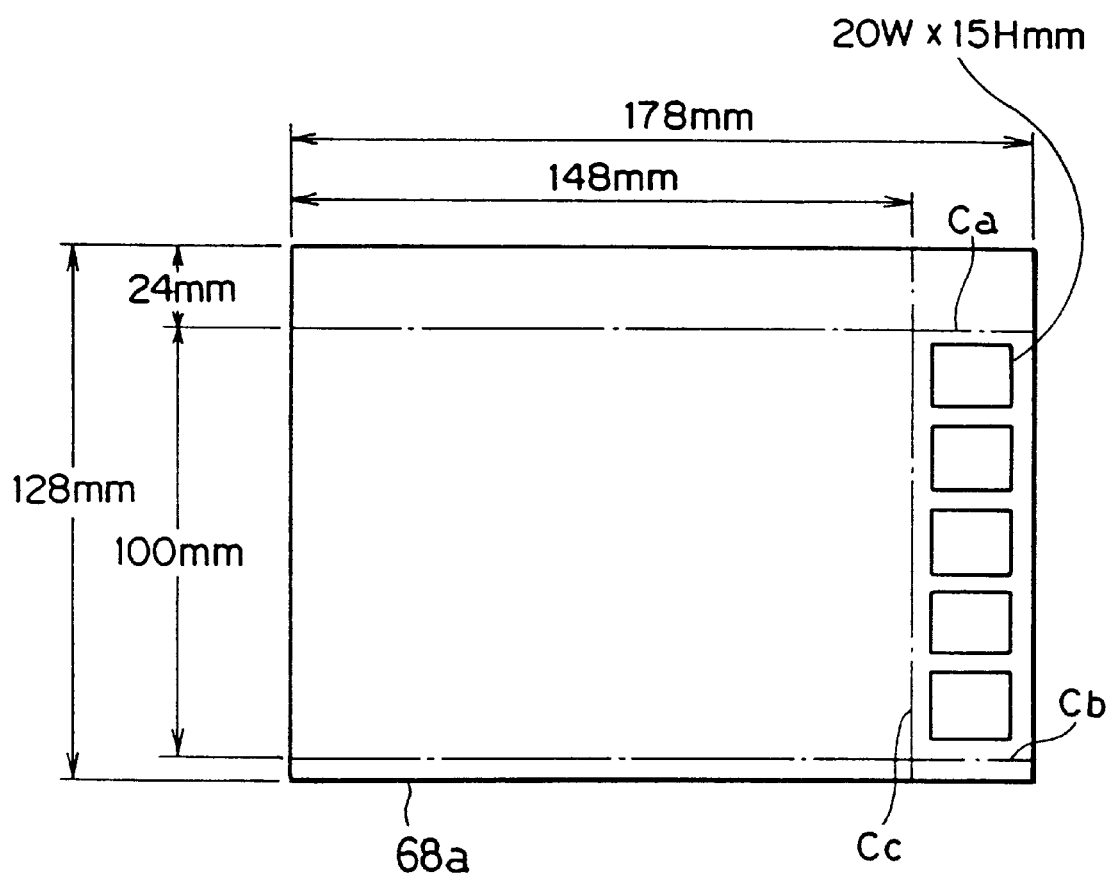
FIG. 34 is a diagram showing an array pattern when the seal print sheet is horizontally set.
Figure 35:
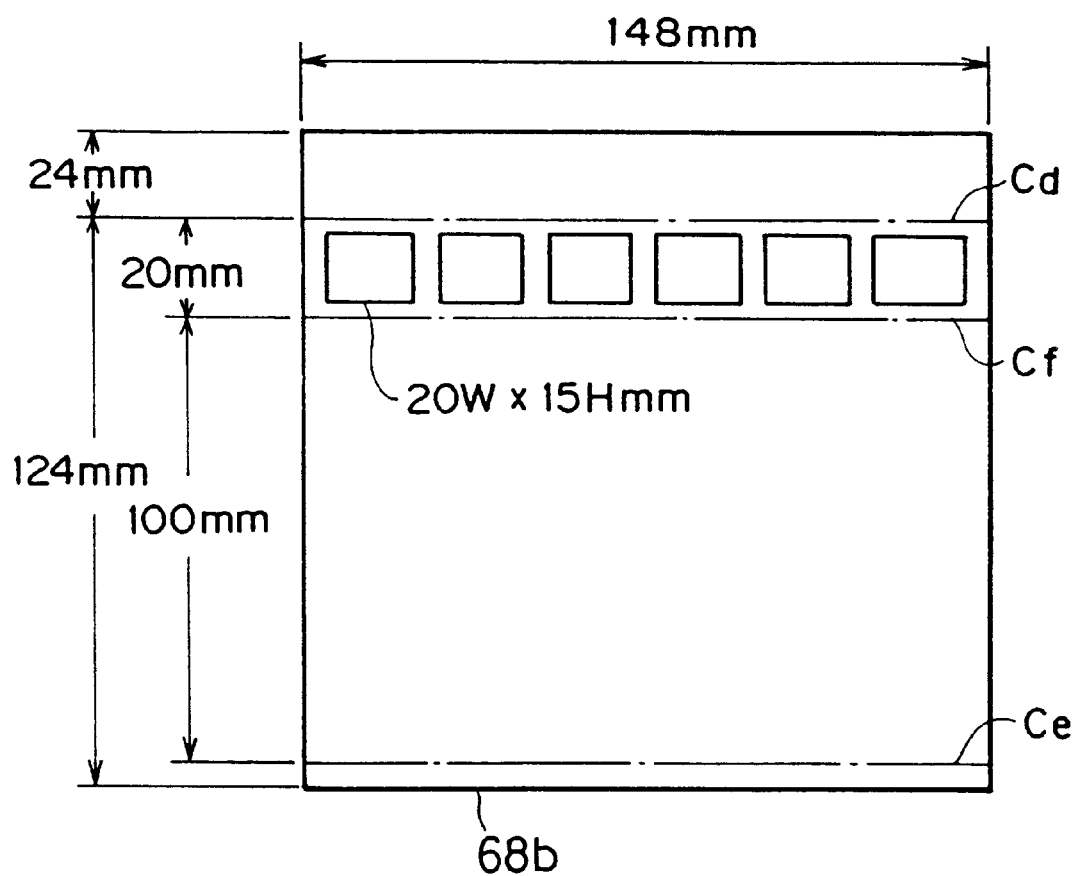
FIG. 35 is diagram showing another array pattern when the seal printing sheet is horizontally set.

Further, there may be provided a multitude of sheet bins and three kinds of seal print sheets 68a, 68b, 68c having different sizes shown in FIGS. 34 to 36 may be used. The array of the frames may be inverted with respect to transverse direction in the cases of FIGS. 34 and 36 and with respect to vertical direction in the case of FIG. 35. Further, perforated lines Ca, Cb, Cd, Ce, Cg, Ch may be cut by a sheet cutting device or may be formed by the knurling device 721. Furthermore, the perforated lines Cc, Cf, Ci, C my be formed by the knurling device 721 if necessary. Alternatively, it may be appreciated to draw a separation line on a recording sheet in place of a perforated line.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image forming system comprising:
   an image memory which stores at least one image;
   a format memory which stores a format defining an arrangement of frames for a composite image, at least one frame of the arrangement having a size larger than that of the other frames;
   an arranging means for arranging the at least one image in accordance with the format;
   an image forming means for forming the composite image on a recording medium; and
   a controlling means for controlling the image forming means to form the composite image in accordance with an arrangement made by the arranging means.

2. The image forming system as defined in claim 1, wherein the format memory stores a plurality of formats defining different arrangements of frames for the composite image.

3. The image forming system as defined in claim 2, further comprising a selector which selects one of the plurality of formats, wherein the arranging means arranges the at least one image in accordance with a format selected by the selector.

4. The image forming system as defined in claim 3, further comprising counting means for counting a number of images stored in the image memory, wherein the selector selects one of the plurality of formats in accordance with the number counted by the counting means.

5. The image forming system as defined in claim 4, further comprising a film scanner which picks up at least one image from a photographed film.

6. The image forming system as defined in claim 1, wherein the recording medium has the form of a sheet.

7. The image forming system as defined in claim 6, wherein the recording medium includes:
   a base layer;
   an adhesive layer separably attached on the base layer; and
   a recording layer attached on the adhesive layer, the recording layer for bearing the composite image.

8. The image forming system as defined in claim 1, wherein the image forming means includes perforating means for forming perforations on the recording medium.

9. The image forming system as defined in claim 8, wherein the perforating means includes a knurled cutter.

10. The image forming system as defined in claim 1, wherein the arranging means includes size changing means for changing the size of the at least one image.

11. The image forming system as defined in claim 1, wherein the image forming means includes a thermal transfer type printer.

12. An image forming apparatus comprising:
   a holder which holds recording mediums one over another, each of the recording mediums having a predetermined size;
   a transporter which transports one of the recording mediums along a specified direction;
   an image former which forms an image of a first format on a specified region of the recording medium transported by the transporter; and forms an image of a second format different from the first format on another region on the recording medium; and
   a separation former which forms a separation on the recording mediums transported by the transporter for driving the specified region of the recording mediums from the other region.

13. The image forming apparatus as defined in claim 12, wherein the separation former is disposed downstream of the image former with respect to the specified direction.

14. The image forming apparatus as defined in claim 12, wherein the separation is perforations.

15. The image forming apparatus as defined in claim 12, wherein the separation former includes a knurled cutter.

16. The image forming apparatus as defined in claim 12, wherein the image former includes:
   an ink ribbon bearing ink; and
   a thermal transfer head for transferring ink of the ink ribbon to the recording mediums.

17. The image forming apparatus as defined in claim 12, wherein the first format and second format differ from each other in size.

18. A method of forming images in an image forming system comprising the steps of:
   detecting a number of image frames in a recording medium;
   detecting a number of unexposed image frames in a recording medium;
   setting a display index format based on the number of unexposed frames, wherein the display index format is set to have at least one enlarged image frame when the number of unexposed frames is greater than a predetermined number, and said enlarged image frame is larger than the other image frames; and displaying the image frames and the at least one enlarged image frame according to the display index format.

19. A method of forming images in an image forming system as claimed in claim 18, wherein the display index format is set so that all of the image frames are the same size when the number of unexposed frames is less than said predetermined number.

20. A method of forming images in an image forming system as claimed in claim 18, wherein the display index format is set to have at least two enlarged image frames when the number of unexposed frames is greater than another predetermined number larger than the predetermined number.

21. A method of forming images in an image forming system as claimed in claim 20, wherein said first predetermined number is 2 and said second predetermined number is 5.

22. A method of forming images in an image forming system as claimed in claim 20, wherein said enlarged images are placed in corners of a display displaying the image frames and the at least one enlarged image frame.

23. A computer readable medium on which a computer program for forming images is stored, said program directing a computer to execute the steps of:

(a) selecting one format from a plurality of formats, each of said formats defining an arrangement of frames for a composite image, at least one of the formats including at least one frame having a size larger than that of the other frames; and (b) generating the composite image by arranging at least one image to the frames in accordance with the format selected in step (a).

24. The computer readable medium as defined in claim 23, wherein the selection in step (a) is automatically executed in accordance with a number of images.

25. A method of forming images in an image forming system containing a controller for performing the method, the method comprising the steps of:

(a) selecting one format from a plurality of formats, each of said formats defining an arrangement of frames for a composite image, at least one of the formats including at least one frame having a size larger than that of the other frames;

(b) generating the composite image by arranging at least one image to the frames in accordance with the format selected in step (a).

26. The method of in claim 25, wherein the selection in step (a) is automatically executed in accordance with a number of images.

* * * * *